United States Patent
Beale et al.

(10) Patent No.: US 12,213,154 B2
(45) Date of Patent: Jan. 28, 2025

(54) COMMUNICATIONS DEVICE, INFRASTRUCTURE EQUIPMENT AND METHODS FOR THE RECEPTION OF CONTROL INFORMATION BY A COMMUNICATIONS DEVICE IN A WIRELESS COMMUNICATIONS NETWORK

(71) Applicant: Sony Group Corporation, Tokyo (JP)

(72) Inventors: Martin Warwick Beale, Basingstoke (GB); Shin Horng Wong, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 443 days.

(21) Appl. No.: 17/629,419

(22) PCT Filed: Jul. 23, 2020

(86) PCT No.: PCT/EP2020/070773
§ 371 (c)(1),
(2) Date: Jan. 24, 2022

(87) PCT Pub. No.: WO2021/023517
PCT Pub. Date: Feb. 11, 2021

(65) Prior Publication Data
US 2023/0141497 A1    May 11, 2023

(30) Foreign Application Priority Data
Aug. 2, 2019  (EP) ..................................... 19189915

(51) Int. Cl.
*H04W 72/04* (2023.01)
*H04W 72/0446* (2023.01)
*H04W 72/232* (2023.01)

(52) U.S. Cl.
CPC ..... *H04W 72/232* (2023.01); *H04W 72/0446* (2013.01)

(58) Field of Classification Search
CPC ........... H04W 72/232; H04W 72/0446; H04W 72/044; H04W 72/23; H04L 27/2636;
(Continued)

(56) References Cited

U.S. PATENT DOCUMENTS

2014/0146720 A1   5/2014  Tang et al.
2017/0134124 A1   5/2017  Lee et al.
(Continued)

FOREIGN PATENT DOCUMENTS

EP   2763467 A1    8/2014
EP   2 882 243 A1  6/2015
(Continued)

OTHER PUBLICATIONS

International Search Report and Written Opinion mailed on Nov. 16, 2020, received for PCT Application PCT/EP2020/070773, Filed on Jul. 23, 2020, 25 pages.
(Continued)

*Primary Examiner* — Wei Zhao
(74) *Attorney, Agent, or Firm* — XSENSUS LLP

(57) ABSTRACT

A method of receiving data by a communications device from a wireless communications network, the method comprising: receiving, via a time divided wireless access interface provided by the wireless communications network, downlink control information (DCI) messages including a slot gap parameter (K0) indicating a time slot gap between a timeslot in which the DCI is received and allocated communications resources, wherein the receiving comprises receiving a current DCI which includes a slot gap parameter for currently allocated communications resources, determining that the slot gap parameter for currently allocated
(Continued)

communications resources is less than a current minimum slot gap value, and in response to determining that the indicated slot gap parameter is less than the current minimum slot gap value, using a default slot gap value to detect data from communications resources of the wireless access interface, and updating the current minimum slot gap value.

18 Claims, 9 Drawing Sheets

(58) Field of Classification Search
CPC ..... H04L 5/0007; H04L 5/005; H04L 5/0053; H04L 27/263
See application file for complete search history.

(56) References Cited

U.S. PATENT DOCUMENTS

| | | |
|---|---|---|
| 2018/0263064 A1 | 9/2018 | Islam et al. |
| 2019/0013903 A1* | 1/2019 | Zhang ............... H04L 1/1854 |
| 2019/0124627 A1 | 4/2019 | Park et al. |
| 2019/0141693 A1 | 5/2019 | Guo et al. |
| 2019/0239093 A1 | 8/2019 | Zhang et al. |
| 2019/0239212 A1 | 8/2019 | Wang et al. |
| 2021/0168779 A1* | 6/2021 | Mondal ............... H04B 7/0874 |
| 2022/0078767 A1* | 3/2022 | Xiong ............... H04L 27/2636 |

FOREIGN PATENT DOCUMENTS

| | | |
|---|---|---|
| EP | 3373676 A1 | 9/2018 |
| EP | 3 404 986 A1 | 11/2018 |
| WO | 2011/149920 A2 | 12/2011 |
| WO | 2014/196616 A1 | 12/2014 |
| WO | 2016/144076 A1 | 9/2016 |
| WO | 2018/031623 A1 | 2/2018 |
| WO | 2019/057092 A1 | 3/2019 |
| WO | 2019/084570 A1 | 5/2019 |
| WO | 2019/099659 A1 | 5/2019 |
| WO | 2020/224924 A1 | 11/2020 |

OTHER PUBLICATIONS

Interdigital Inc, "On Cross-slot Scheduling for UE Power Saving", 3GPP TSG RAN WG1 #97, R1-1907105, May 13-17, 2019, 6 pages.

Holma et al., "LTE for UMTS OFDMA and SC-FDMA Based Radio Access", John Wiley & Sons, 2009, 232 pages.

3GPP, "Physical layer procedures for data (Release 15)", 3GPP TS 38.214, V15.2.0, Jun. 2018, 95 pages.

CATT et al., "New WID: UE Power Saving in NR", 3GPP TSG RAN Meetings #83, RP-190727, Mar. 18-21, 2019, pages.

Nokia et al., "Revised SID: Study on NR Industrial Internet of Things (IoT)", 3GPP TSG RAN meeting #81, RP-182090, Sep. 10-13, 2018, 5 pages.

Ericsson, "Procedure for Cross-Slot Scheduling Technique", 3GPP TSG-RAN WG1 Meeting #97, Tdoc R1-1907323, May 13-17, 2019, 5 pages.

3GPP, "Medium Access Control (MAC) protocol specification (Release 15)", 3GPP TS 38.321, V15.3.0, Sep. 2018, 76 pages.

* cited by examiner

COMMUNICATIONS DEVICE, INFRASTRUCTURE EQUIPMENT AND METHODS FOR THE RECEPTION OF CONTROL INFORMATION BY A COMMUNICATIONS DEVICE IN A WIRELESS COMMUNICATIONS NETWORK

CROSS-REFERENCE TO RELATED APPLICATIONS

The present application is based on PCT/EP2020/070773 filed on Jul. 23, 2020, and claims priority to EP 19189915.2 filed on Aug. 2, 2019, the entire contents of each are incorporated herein by reference.

BACKGROUND

Field

The present disclosure relates to communications devices, infrastructure equipment and methods for the reception of control information by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

An example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of communications devices associated with different traffic profiles gives rise to new challenges for efficiently handling communications in wireless telecommunications systems that need to be addressed.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
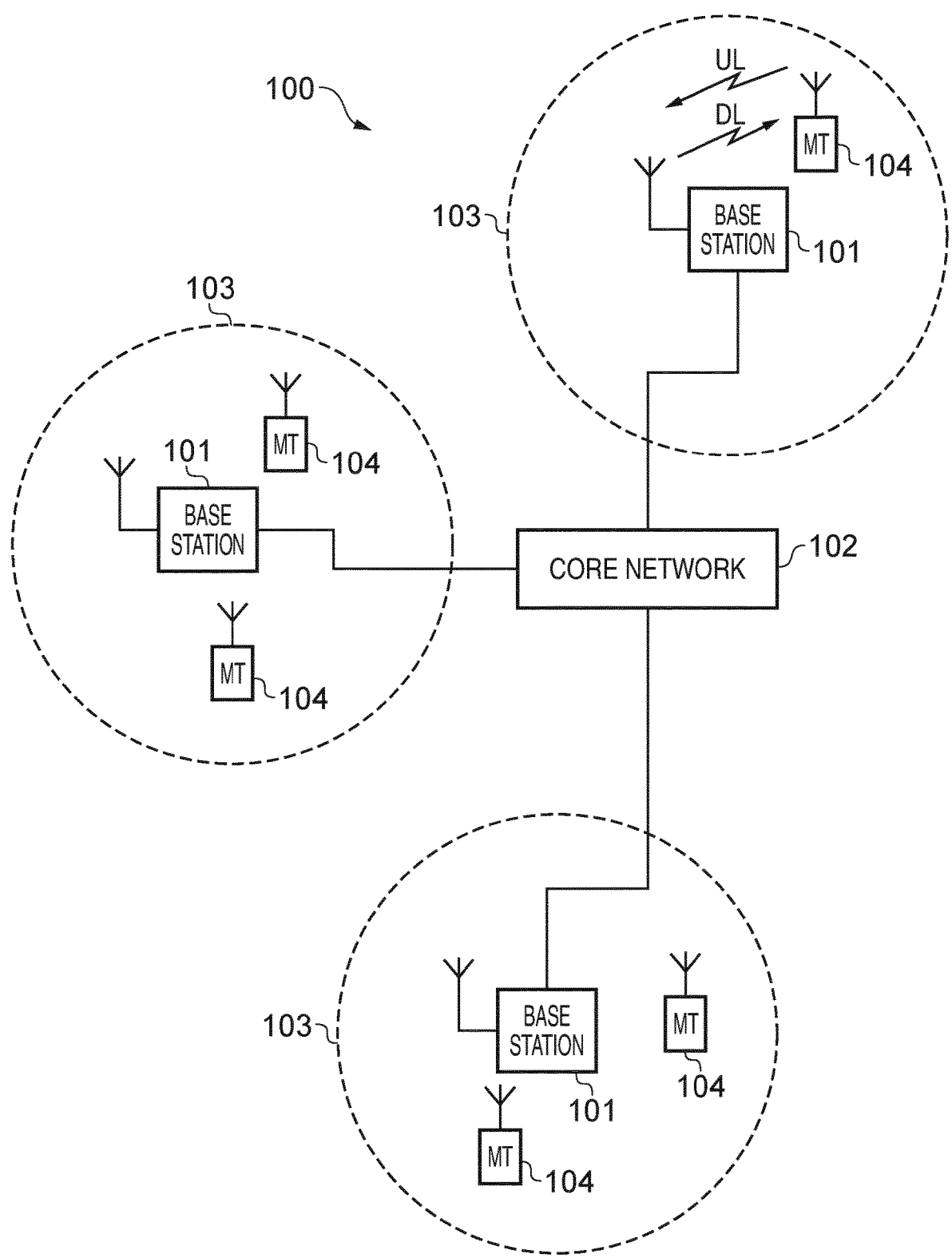
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.
New Radio Access Technology (5G)

Figure 2:
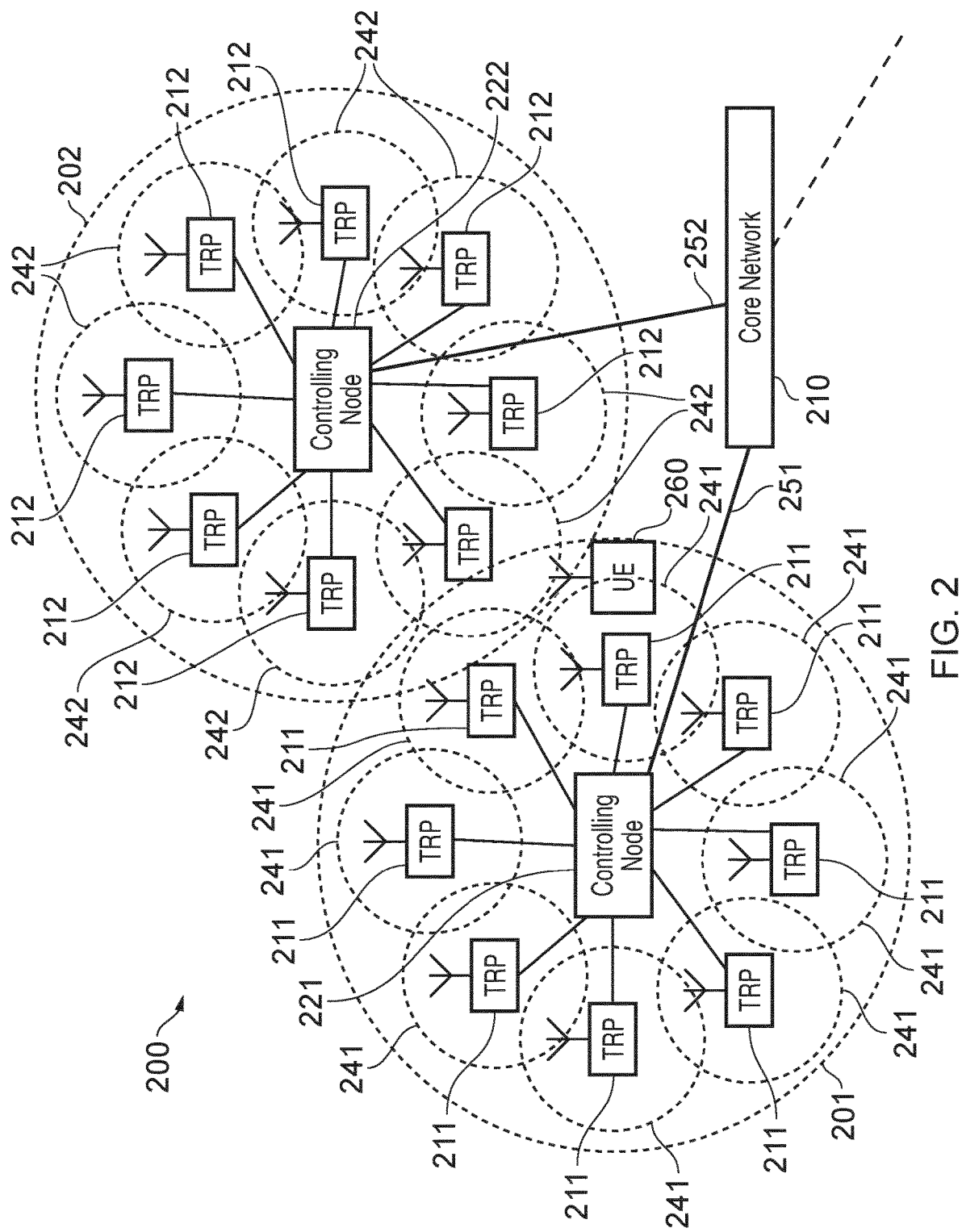
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/ remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated that in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated that the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
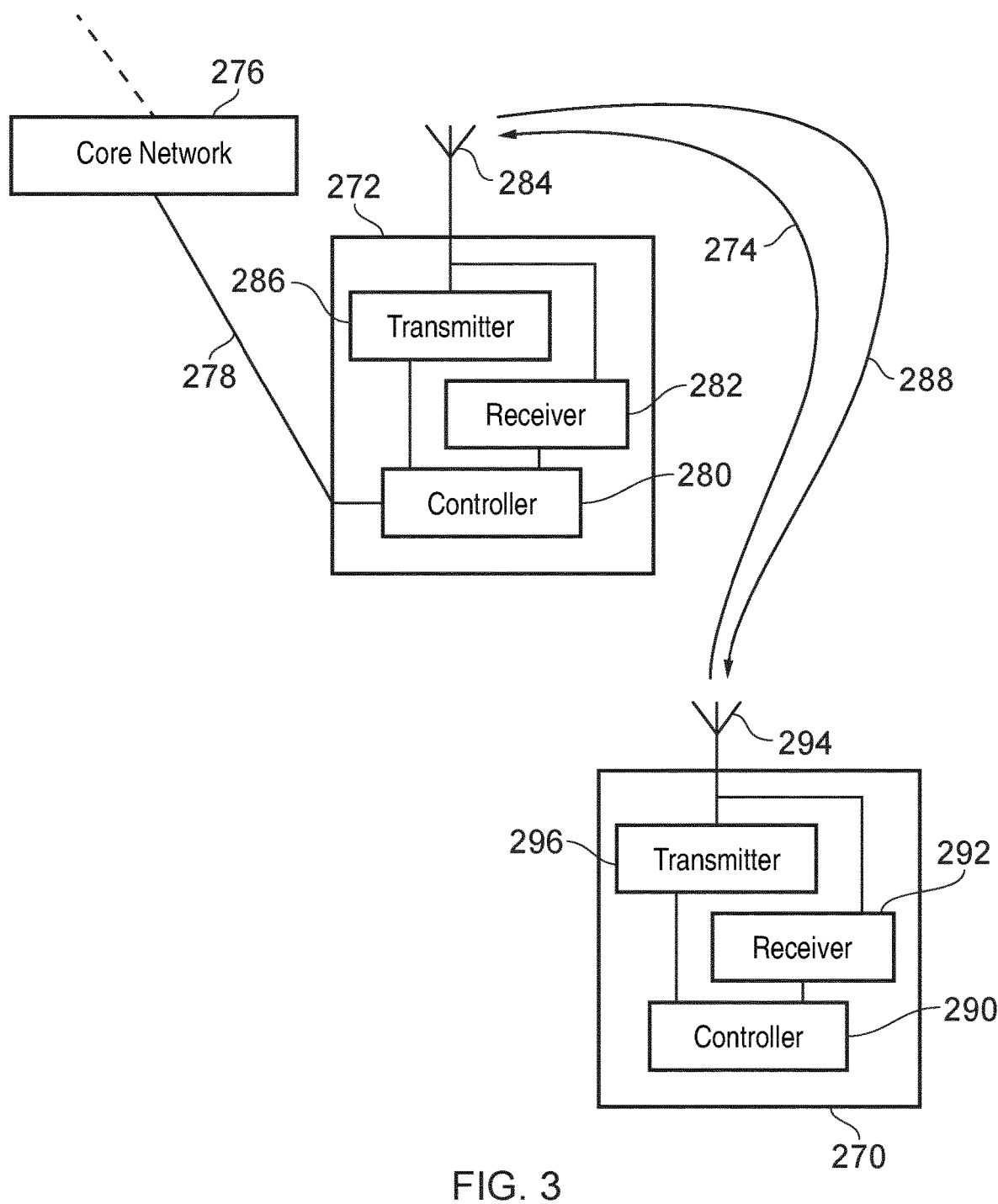
FIG. 3 is a schematic block diagram of an example infrastructure equipment and communications device which may be configured in accordance with example embodiments.

A more detailed illustration of a UE/communications device 270 (which may correspond to a communications device such as the communications device 260 of FIG. 2 or the communications device 104 of FIG. 1) and an example network infrastructure equipment 272, which may be thought of as a gNB 101 or a combination of a controlling node 221 and TRP 211, is presented in FIG. 3. As shown in FIG. 3, the UE 270 is shown to transmit uplink data to the infrastructure equipment 272 via uplink resources of a wireless access interface as illustrated generally by an arrow 274 from the UE 270 to the infrastructure equipment 272. The UE 270 may similarly be configured to receive downlink data transmitted by the infrastructure equipment 272 via downlink resources as indicated by an arrow 288 from the infrastructure equipment 272 to the UE 270. As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

5G, URLLC and Industrial Internet of Things

Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. The requirements for Ultra Reliable & Low Latency Communications (URLLC) services are for a reliability of $1-10^{-5}$ (99.999%) or higher for one transmission of a 32 byte packet with a user plane latency of 1 ms [3]. In some scenarios, there may be a requirement for a reliability of $1-10^{-6}$ (99.9999%) or higher with either 0.5 ms or 1 ms of user plane latency. Massive Machine Type Communications (mMTC) is another example of a service which may be supported by NR-based communications networks.

In addition, systems may be expected to support further enhancements related to Industrial Internet of Things (IIoT) in order to support services with new requirements of high availability, high reliability, low latency, and in some cases, high-accuracy positioning.

Industrial automation, energy power distribution and intelligent transport systems are examples of new use cases for Industrial Internet of Things (IIoT). In an example of industrial automation, the system may involve different distributed components working together. These components may include sensors, virtualized hardware controllers and autonomous robots, which may be capable of initiating actions or reacting to critical events occurring within a factory and communicating over a local area network.

The UEs in the network may therefore be expected to handle a mixture of different traffic, for example, associated with different applications and potentially different quality of service requirements (such as maximum latency, reliability, packet sizes, throughput). Some messages for transmission may be time sensitive and be associated with strict deadlines and the communications network may therefore be required to provide time sensitive networking (TSN) [6].

URLLC services are required in order to meet the requirements for IIoT, which require high availability, high reliability, low latency, and in some cases, high-accuracy positioning [1]. Some IIoT services may be implemented by using a mixture of eMBB and URLLC techniques, where some data is transmitted by eMBB and other data is transmitted by URLLC.

Downlink Control Information

In 5G/NR, communications resources for both uplink and downlink communications are allocated by the infrastructure equipment, and may be signalled to the communications device in downlink control information (DCI), transmitted using a physical downlink control channel (PDCCH).

Each communications device may be configured with a specific search space within which the PDCCH may exist, the search space defining communications resources (and, optionally, other parameters) with which DCI allocating communications resources to that communications device may be transmitted.

Communications Resources for Downlink Data

Downlink data transmitted to a communications device may be transmitted using a Physical Downlink Shared Channel (PDSCH). The PDSCH can be dynamically scheduled by the infrastructure equipment in a Downlink (DL) Grant, i.e. scheduling information contained in a DCI. The DCI may be formatted in accordance with one of a plurality of predetermined (e.g. standardised) formats, such as DCI Format 1_0 and DCI Format 1_1.

The DL Grant comprises Frequency Domain Resource Assignment (FDRA) and Time Domain Resource Assignment (TDRA) fields, which indicate the frequency and time resources of the PDSCH respectively. The FDRA indicates a number and location of physical resource blocks (PRBs) occupied by the PDSCH.

The TDRA field may comprise an indication of an index or row of a TDRA Table, where each entry/row in this table may specify a position of downlink measurement reference symbols (DMRS), a mapping type for the PDSCH (which may be a Type A or Type B mapping), a slot gap parameter $K_0$, a start symbol offset S and a duration of the PDSCH resources L.

Figure 4:
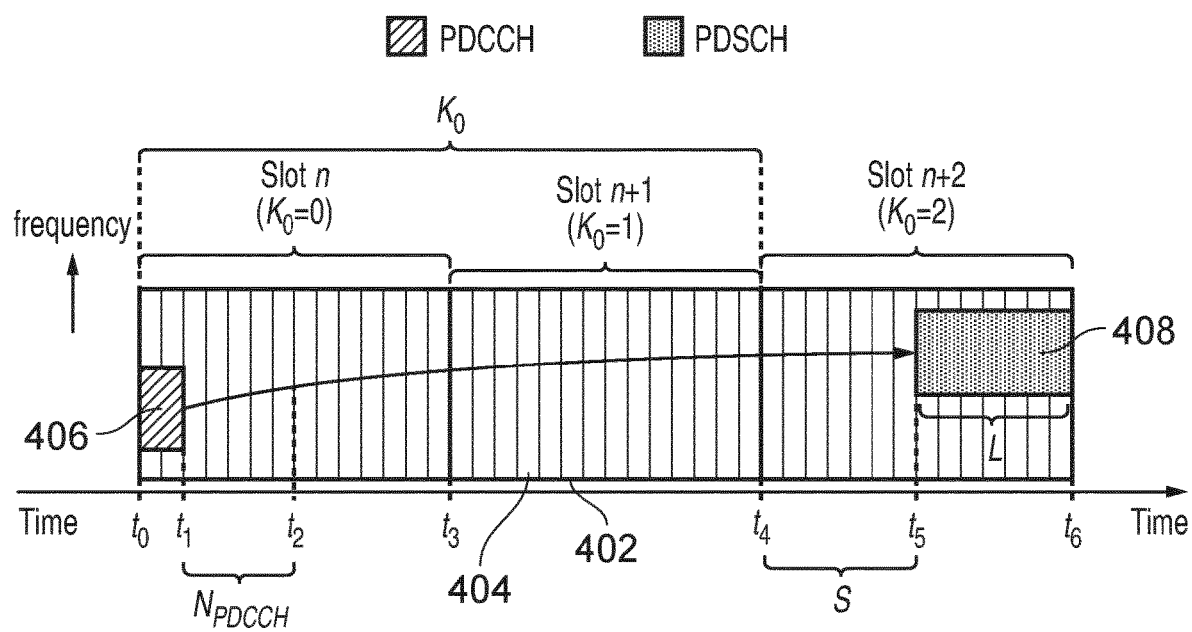
FIG. 4 illustrates a reception of downlink data in accordance with conventional techniques.

FIG. 4 illustrates a reception of downlink data in accordance with conventional techniques. FIG. 4 illustrates an example of a use of the $K_0$, S and L parameters for a PDSCH.

FIG. 4 shows communications resources 402 of a downlink of a wireless access interface of a wireless communications network. The communications resources are divided into timeslots n, n+1, n+2, each of which is further subdivided into 14 orthogonal frequency division multiplexing (OFDM) symbol periods 404.

A DL grant is transmitted within a PDCCH transmission 406 from time t0 to time t1 within timeslot n. The DL Grant comprises a TDRA index which points to an entry in the TDRA Table which indicates parameters $K_0$=2, S=7 and L=7. Since the DL Grant is in Slot n, the allocated PDSCH resources therefore start in Slot n+$K_0$, i.e. Slot n+2. The symbol offset from the slot boundary of Slot n+2 is indicated by the parameter S, which in this case is 7 symbols from the slot boundary. Accordingly, the start time of the PDSCH is at time t5 (7 symbols from the start of timeslot n+2). The duration of the PDSCH is L=7 symbols. Hence, the TDRA parameters indicate a PDSCH transmission between time t5 and t6 as shown in FIG. 4. The entries in the TDRA table may be semi-statically configured by radio resource configuration (RRC) and the size of the table may in some examples be limited to 16 entries.

Until a DCI has been successfully decoded, it is not possible for the communications device to determine which, if any, communications resources have been allocated to it for the uplink or downlink transmission of data. In the case of downlink transmissions, if the allocated communications resources may coincide in time with the blind decoding of the DCI, it is necessary for the communications device to pre-emptively receive and buffer signals received on downlink communications resources which may be allocated for the downlink transmission of data. These buffered signals may subsequently be processed (i.e. decoded) only if the DCI is successfully decoded indicating that downlink data is (has been) transmitted using these downlink communications resources.

In the example of FIG. 4, a downlink PDCCH transmission 406 occurs from time t0 to time t1. A communications device, such as the communications device 270 described above, controls its receiver 292 to receive the signals of the PDCCH, in accordance with a pre-configured PDCCH search space.

During the time period $N_{PDCCH}$ from time t1 to time t2, the communications device 270 performs blind decoding of the PDCCH received signals. The PDCCH transmission 406 may indicate that downlink communications resources starting at, or after, time t1 are allocated for the downlink transmission of data to the communications device 270. Accordingly, during the time period from t1 to t2, the communications device 270 may configure its receiver to receive downlink signals of a PDSCH on which the downlink data may be being transmitted.

In the example of FIG. 4, as a result of the blind decoding of the PDCCH signals received from time t0 to time t1, the communications device 270 determines that PDCCH transmission 406 comprises DCI. Furthermore, the communications device 270 determines that the DCI indicates that downlink communications resources 408 of the PDSCH, from time t5 to time t6, are allocated for the downlink transmission of data to the communications device 270. Accordingly, the communications device 270 may control its receiver 292 to receive signals of the PDSCH from time t5 to time t6. These received PDSCH signals may be decoded, and the communications device 270 may accordingly receive the data transmitted by the infrastructure equipment.

It has been appreciated that requiring the communications device 270 to enable its receiver during the time period t1 to t2 (i.e. while blind decoding of the PDCCH signal is being carried out) is an inefficient use of power, especially in cases (as in FIG. 4) where no PDSCH transmission is scheduled for the communications device 270 during that time.

To address this, one proposal within the context of ongoing work related to power-saving in 5G/NR [5] is that a DL grant may only allocate downlink communications resources which start in a slot occurring after the slot in which the DL grant is transmitted. In other words, $K_0$ may be constrained to be no less than 1. Such scheduling is referred to as 'cross-slot scheduling'. In accordance with this proposal, the communications device 270 would not be required to enable its receiver between the end of the communications resources on which the DCI may be transmitted, and the beginning of the subsequent slot. Examples of techniques using cross-slot scheduling may be found in [6], [7].

As described above, one of the targeted services for 5G is Ultra Reliable Low Latency Communications (URLLC) where it is required that a data packet at layer 2 is transmitted with a latency that is less than 1 ms or 0.5 ms with reliability of 99.999% to 99.9999%. Since the cross-slot scheduling power saving scheme introduces additional latency, and considering that a slot duration may be 1 ms for 15 kHz Subcarrier Spacing, it is not suitable for URLLC transmissions. Hence, 'same-slot' scheduling may be required for URLLC transmissions, whereby $K_0=0$ (or at least is permitted to be 0) such that a DL grant may allocate downlink communications resources which start in the same slot as the slot in which the DL grant is transmitted. Same-slot scheduling may also provide improved scheduling performance because the allocation of communications resources occurs (in time) very close to the communications resources themselves.

However, operating the communications device 270 in the 'same-slot' scheduling mode for long periods of time when no data is being transmitted, and/or when data not having low latency requirements is being transmitted results in unnecessary power consumption associated with receiving and buffering signals in which no downlink data is being transmitted, as described above.

Thus, there is a need to selectively enable the communications device 270 to operate in accordance with a same-slot scheduling scheme.

Embodiments of the present technique provide a method of receiving data by a communications device from a wireless communications network, the method comprising: receiving, via a time divided wireless access interface provided by the wireless communications network, downlink control information (DCI) messages providing an indication of allocated communications resources, the DCIs including a slot gap parameter (K0) indicating a time slot gap between a timeslot in which the DCI is received and the allocated communications resources, wherein the receiving comprises receiving a current DCI which includes a slot gap parameter for currently allocated communications resources, determining that the slot gap parameter for currently allocated communications resources is less than a current minimum slot gap value, the current minimum slot gap value defining an earliest time slot in which communications resources can be allocated by means of a DCI, and in response to determining that the indicated slot gap parameter is less than the current minimum slot gap value, using a default slot gap value to detect data from communications resources of the wireless access interface, and updating the current minimum slot gap value.

In accordance with embodiments of the present technique, a communications device can switch between a cross-slot scheduling mode of operation and a same-slot scheduling mode of operation, in order to minimise power consumption, when appropriate, while permitting low-latency scheduling of downlink traffic, whereby each scheduling opportunity can be used for the scheduling of communications resources for the transmission of downlink data to the communications device, irrespective of the current mode of operation of the communications device.

Described above are 'same-slot' and 'cross-slot' scheduling modes. Scheduling modes may more generally be characterised by a 'minimum slot gap parameter', $K_{0,min}$, which can be defined as a lowest permitted value of $K_0$. In the example of cross-slot scheduling, $K_{0,min}$ may be 1 or a higher value. In the example of same-slot scheduling, $K_{0,min}$ is 0.

Implicit Change of K0,Min Based on DCI which Allocates Communications Resources

In embodiments of the present technique, a default $K_0$ value $K_{0,default}$ is determined by the communications device 270. When operating in a cross-slot scheduling mode (i.e. where $K_{0,min}>0$), if downlink control information (DCI) is received indicating communications resources in accordance with a same-slot scheduling mode (e.g. where the communications resources are within the same timeslot as the timeslot in which the DCI was transmitted), the communications device 270 updates its $K_{0,min}$ value. The communications device 270 determines communications resources based on parameters other than the $K_0$ parameter indicated by the DCI in combination with $K_{0,default}$. Downlink data is transmitted to (and received by) the communications resources using the determined communications resources.

Embodiments of the present technique thus provide a solution in which a single DCI is used both for indicating a change of $K_{0,min}$ and for scheduling downlink data, thus making efficient use of scheduling opportunities. This is beneficial in particular where scheduling opportunities are rare, e.g. where the PDCCH monitoring occasion periodicity is large.

Figure 5:
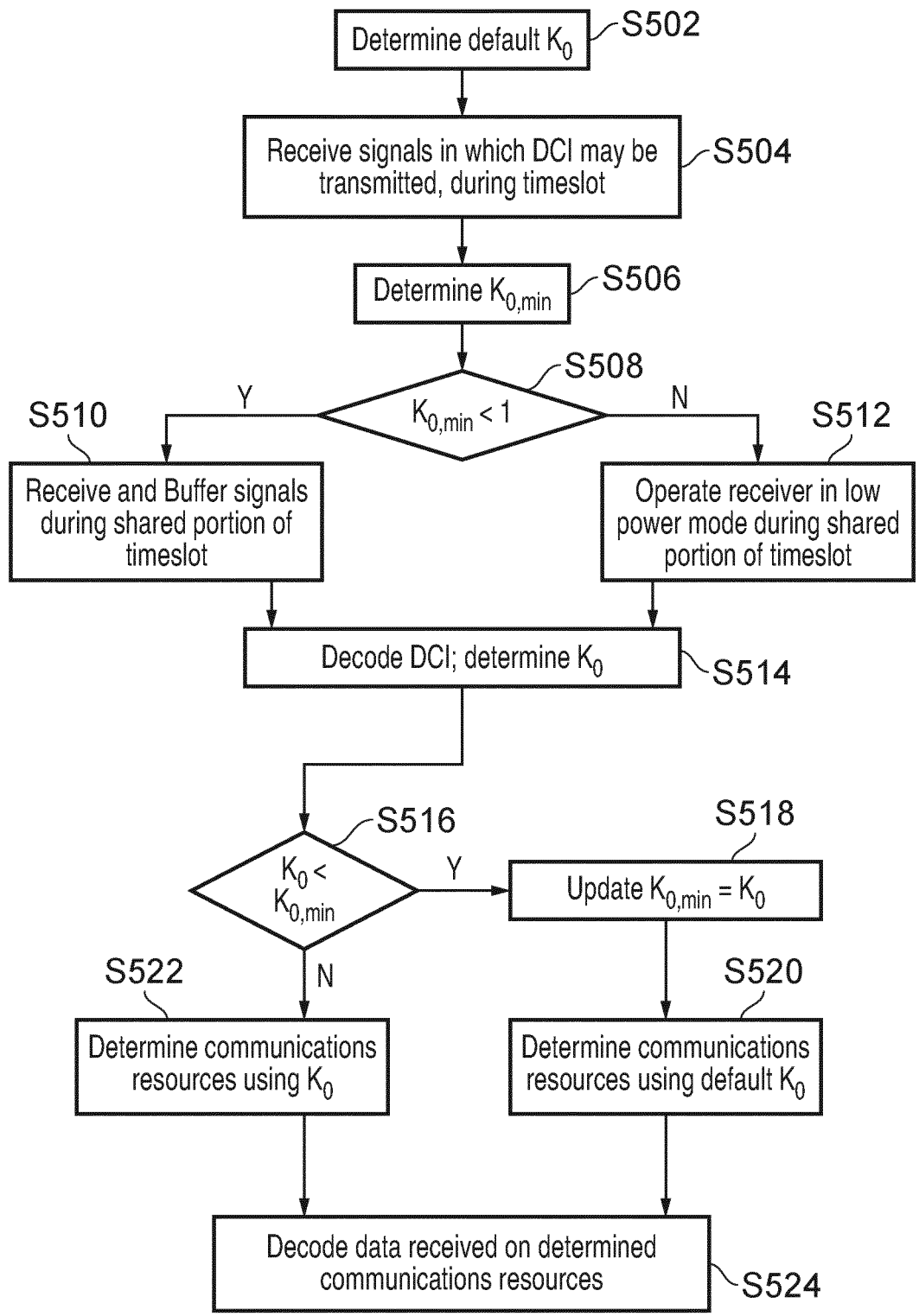
FIG. 5 illustrates a process which may be carried out by a communications device in accordance with embodiments of the present technique.

FIG. 5 illustrates a process which may be carried out by the communications device 270 in accordance with embodiments of the present technique.

The process of FIG. 5 starts at step S502, in which the communications device 270 determines the default slot gap parameter $K_{0,default}$. Control then passes to step S504 in which the communications device 270 receives signals in communications resources which may be used for the transmission of downlink control information (DCI). For example the signals may correspond to a PDCCH channel transmitted using the wireless access interface provided by the infrastructure equipment of the wireless communications network.

Control then passes to step S506 in which the communications device 270 determines a minimum slot gap parameter $K_{0,min}$. This, as described above, may restrict the opportunities and communication resources during which data may be transmitted using communications resources allocated by a DCI transmitted using the signal received in step S504.

In step S508, the communications device 270 determines whether $K_{0,min}$ is less than 1. That is, it determines whether or not same slot scheduling is permitted. If it is determined that $K_{0,min}$ is less than 1, then control passes to step S510 in which the communications device 270 receives signals and buffers them for subsequent decoding, the signals being received during a remaining portion of a time slot (referred to as a shared portion of the timeslot, with reference to FIG. 6) in which the signals received in S504 were transmitted. In particular, the communications device 270 may receive and buffer signals transmitted using communications resources which may be allocated, for example using a physical downlink shared channel (PDSCH) in accordance with the same slot scheduling scheme by the DCI which may have been received in step S504.

Accordingly, the communications device 270 controls its receiver to receive signals transmitted in the same time slot as a DCI which was transmitted using PDCCH resources of the timeslot, at least until that DCI is decoded. If the communications device 270 determines that a DCI was transmitted and that the DCI allocates downlink communications resources for the communications device 270, the communications device 270 may continue to receive signals and buffers them until the end of the time slot, or may continue to receive signals and buffer them until the end of the allocated communications resources, if that occurs before the end of the timeslot.

If (not shown in FIG. 5), at some time after receiving the signals at step S504 and after attempting to decode a DCI, the communications device 270 fails to decode any DCI allocating communications resources in that timeslot, then the communications device 270 may stop receiving and buffering signals from that time and the process ends.

If at step S508, it is determined that $K_{0,min}$ is not less than 1, and therefore that same slot scheduling is not permitted, then control passes to step S512, in which the communications device may operate its receiver in a low power mode of operation during the remainder of the time slot during which the signals received in step S504 were transmitted. This corresponds to a scenario where same slot scheduling is not permitted, and therefore the communications device may operate in a power saving mode in which it does not receive and buffer signals transmitted during the remainder of a time slot.

Following steps S510 and step S512, control passes to step S514, in which the communications device 270 decodes the signals received in step S504 to determine if a DCI was transmitted to the communications device 270. If a DCI was transmitted to the communications device 270, it then determines parameters indicated by the DCI which may allocate communication resources for the transmission of downlink data. In particular, the DCI may comprise an index corresponding to a row of a pre-determined table, the index corresponding to a pre-determined slot gap parameter value and S and L values as described above.

In the process of FIG. 5 it is assumed that at step S514 DCI is decoded which is addressed to the communications device 270.

Control then passes to step S516 in which the communications device 270 determines whether the slot gap value indicated in the DCI is less than the current minimum slot gap parameter $K_{0,min}$. If it is then control passes to step S518.

In step S518, the communications device 270 updates the minimum slot gap parameter $K_{0,min}$ to a new value. In some embodiments, the new $K_{0,min}$ value is set to be equal to the $K_0$ value corresponding to the row/index indicated by the DCI. Control then passes to step S520.

In step S520, the communications device 270 determines communication resources allocated for the transmission of pending data using the default slot gap parameter $K_{0,default}$. That is to say it determines the communication resources without regard to the value of the slot gap parameter indicated in the DCI decoded at step S514. In some embodiments, it may additionally use parameters S and L for determining the start time and duration of the allocated communications resources, as described above and illustrated in FIG. 4.

If at step S516 it is determined that the slot gap parameter $K_0$ indicated by the DCI is not less than the minimum slot gap parameter $K_{0,min}$ determined at step S506, then control passes to step S522.

In step S522, the communications device 270 determines communication resources allocated for the transmission of downlink data using the slot gap parameter and symbol value indicated in the DCI and determined at step S514. This determination may be substantially in accordance with the conventional techniques as described above with respect to FIG. 4.

Following step S522 and step S520, control passes to step S524, in which the communications device 270 decodes data received on the determined communication resources.

This process may be repeated continually, in which case after step S524 the control may return to step S504.

Figure 6:
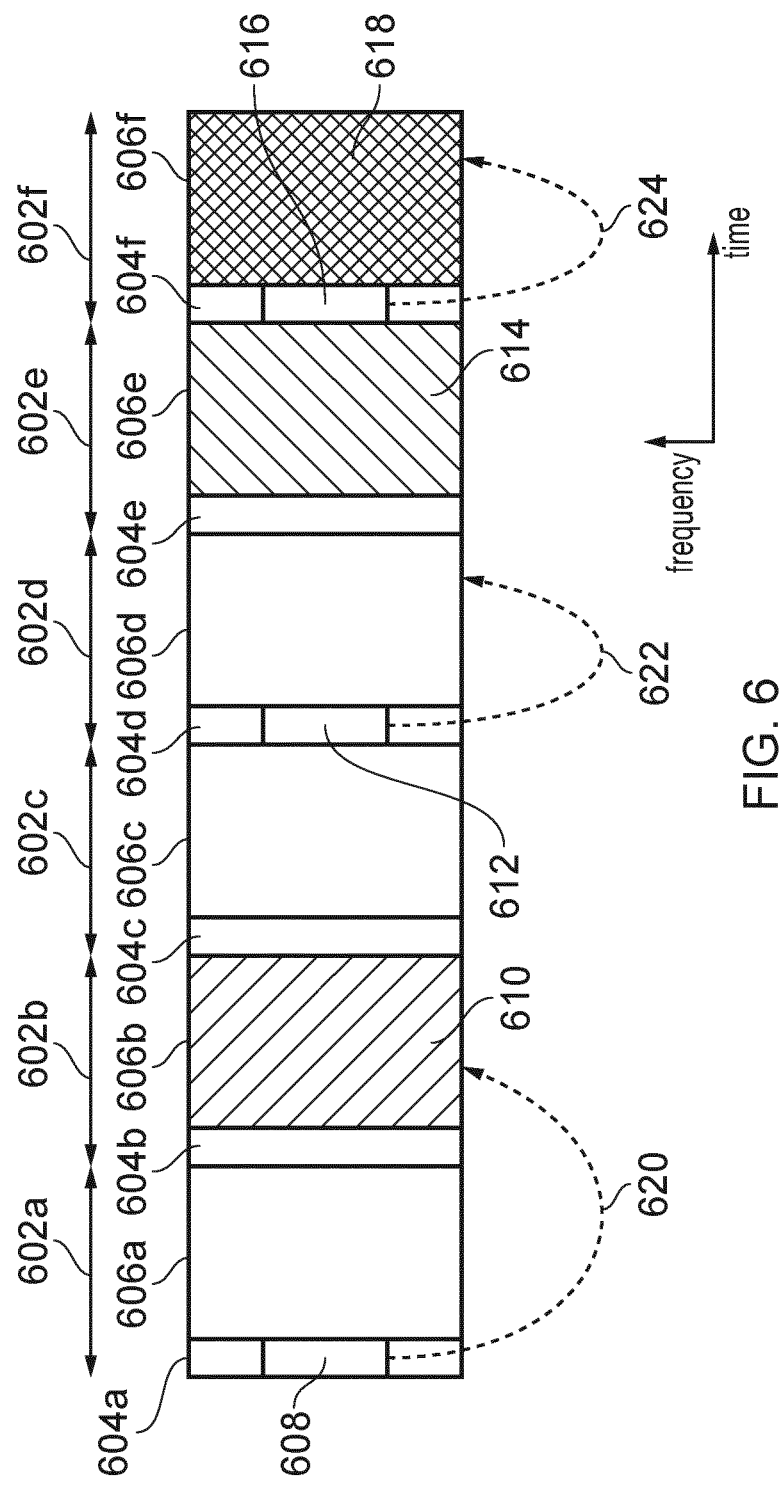
FIG. 6 illustrates a sequence of transmissions in accordance with embodiments of the present technique, which may arise in accordance with the process illustrated in FIG. 5.

FIG. 6 illustrates a sequence of transmissions in accordance with embodiments of the present technique, which may arise in accordance with the process described above and illustrated in FIG. 5.

FIG. 6 shows communication resources of a downlink portion of a wireless access interface. The communication resources are divided into time slots 602a-602e. Each time slot 602 may be further subdivided into a control portion 604 and a shared portion 606, the shared portion 606 being for receiving data by communications devices, such as by means of a shared channel such as a physical downlink shared channel (PDSCH).

In some embodiments, in a given timeslot, the shared portion 606 may overlap the control portion 604. However, the control portion may be constrained to occupy a restricted set of communications resources within a timeslot (e.g. a specific set of OFDM symbols), as shown in FIG. 6.

In the example of FIG. 6 the communications device 270 initially is configured with a minimum slot gap parameter $K_{0,min}$ of 1 and determines that the default slot gap parameter $K_{0,default}$ is also equal to 1. In the first control portion 604a of the first time slot 602a, the infrastructure equipment transmits first downlink control information 608. In accordance with the minimum slot gap parameter $K_{0,min}$, after the communications device 270 has received the signals of the control portion 604a, the communications device 270 controls its receiver to enter a reduced power mode for the duration of the shared portion 606a of the first time slot 602a. During the shared portion of the time slot 606a, the communications device decodes the first DCI 608 and determines that it indicates a slot gap parameter of 1 which indicates that downlink communication resources are allocated in the second timeslot 602b. In particular, the communications device 270 determines that the slot gap parameter indicated by the first DCI 608 is not less than the minimum slot gap parameter $K_{0,min}$. Accordingly, the communications device 270 determines the communication resources 610 within the shared portion 606b of the second time slot 602b and receives and decodes the downlink data in accordance with the indications in the first DCI 608.

Subsequently, in the control portion 604d of the fourth time slot 602d, the communications device 270 receives a second DCI 612. Again, because the minimum slot gap parameter $K_{0,min}$ of the communications device 270 is 1, the communications device 270 may operate in a power saving mode for the remainder of the fourth time slot 602d while it decodes the second DCI 612. As a result of decoding the second DCI 612, the communications device determines that the second DCI 612 comprises an indication of a slot gap parameter of 0. Because the indicated slot gap parameter of 0 is less than the minimum slot gap parameter $K_{0,min}$ of the communications device, the communications device 270 determines the allocated communication resources for the downlink data transmission based on the default slot gap parameter $K_{0,default}$ i.e. based on a slot gap parameter of 1. Accordingly, the communications device 270 determines that downlink data is transmitted using second downlink communication resources 614 during the shared portion 606e of the fifth time slot 602e. In addition, because the communications device determined that the slot gap parameter indicated by the second DCI 612 is less than the minimum slot gap parameter $K_{0,min}$, the communications device 270 updates its minimum slot gap parameter accordingly. In the example of FIG. 6 the minimum slot gap parameter is updated to be equal to the slot gap parameter indicated by the corresponding DCI, that is to say the slot gap parameter of 0 indicated by the second DCI 612. The communications device then receives and decodes the second data transmitted using the second downlink communication resources 614 during the fifth time slot 602e.

During the control portion 604f of the sixth time slot 602f, the communications device 270 receives a third DCI 616. However because the minimum slot gap parameter of the communications device 270 is now equal to 0, and therefore indicates that the same slot scheduling is permitted, the communications device 270 receives and buffers signals received during the shared portion 606f of the sixth time slot 602f. Meanwhile the communications device 270 decodes the third DCI 616 and determines that the third DCI 616 comprises an indication of downlink communication resources by means of an indicated slot gap parameter of 0. Since the indicated slot gap parameter of 0 is not less than the communication device's minimum slot gap parameter, the communications device determines the allocated downlink communications resources 618 based on the parameters indicated in the third DCI 616 and accordingly decodes downlink data from the third downlink communication resources 618 received within the shared portion 606f of the sixth time slot 602f.

It will be thus appreciated that in accordance with embodiments of the present technique, it is possible for the infrastructure equipment to both schedule downlink communication resources for the transmission of downlink data and to indicate that the communications device 270 should update its minimum slot gap parameter $K_{0,min}$ using a single DCI. In the example of FIG. 6 this is done using the second DCI 612.

In some embodiments, the default value $K_{0,default}$ is set by the wireless communications network and indicated to the communications device 270 in RRC signalling. In some embodiments the RRC signalling is unicast signalling directed solely to the communications device 270. In some embodiments, the RRC signalling is multicast signalling directed to multiple communications devices, such as via system information broadcast (SIB) signalling.

The setting of the default value $K_{0,default}$ by the network may, in some embodiments, be preceded by the transmission of an indication of a preferred or requested default value $K_{0,default}$ by the communications device 270, for example as part of an RRC configuration or RRC re-configuration procedure. The default value $K_{0,default}$ set by the network may be equal to, or different from, the default value $K_{0,default}$ indicated by the communications device.

In some embodiments, the default value $K_{0,default}$ is associated with the communications device 270, for example at manufacture or during a configuration prior to sale to an end user. The default value $K_{0,default}$ associated with the communications device 270 may be transmitted to the communications network. For example, in some embodiments, an indication of capabilities of the communications device 270 comprises an indication of the default value $K_{0,default}$ associated with the communications device 270.

In some embodiments, the default value $K_{0,default}$ is defined in standards specifications. The standards specifications may be those administered by 3GPP®.

In some embodiments, the default value $K_{0,default}$ is the current value of $K_{0,min}$ for the communications device 270.

In some embodiments, the communications device 270 operates according to the new $K_{0,min}$ value in the slot that is the $K_{0,default}$'th slot after the scheduling DCI indicates the new $K_{0,min}$ value. In other words, $K_{0,default}$ may define a maximum permitted reaction time between the reception of a DCI indicating that the $K_{0,min}$ value is to be changed, and a slot in which the communications device 270 acts in accordance with the modified $K_{0,min}$ value.

Change of $K_{0,min}$ Based on TDRA Table Index

Figure 7:
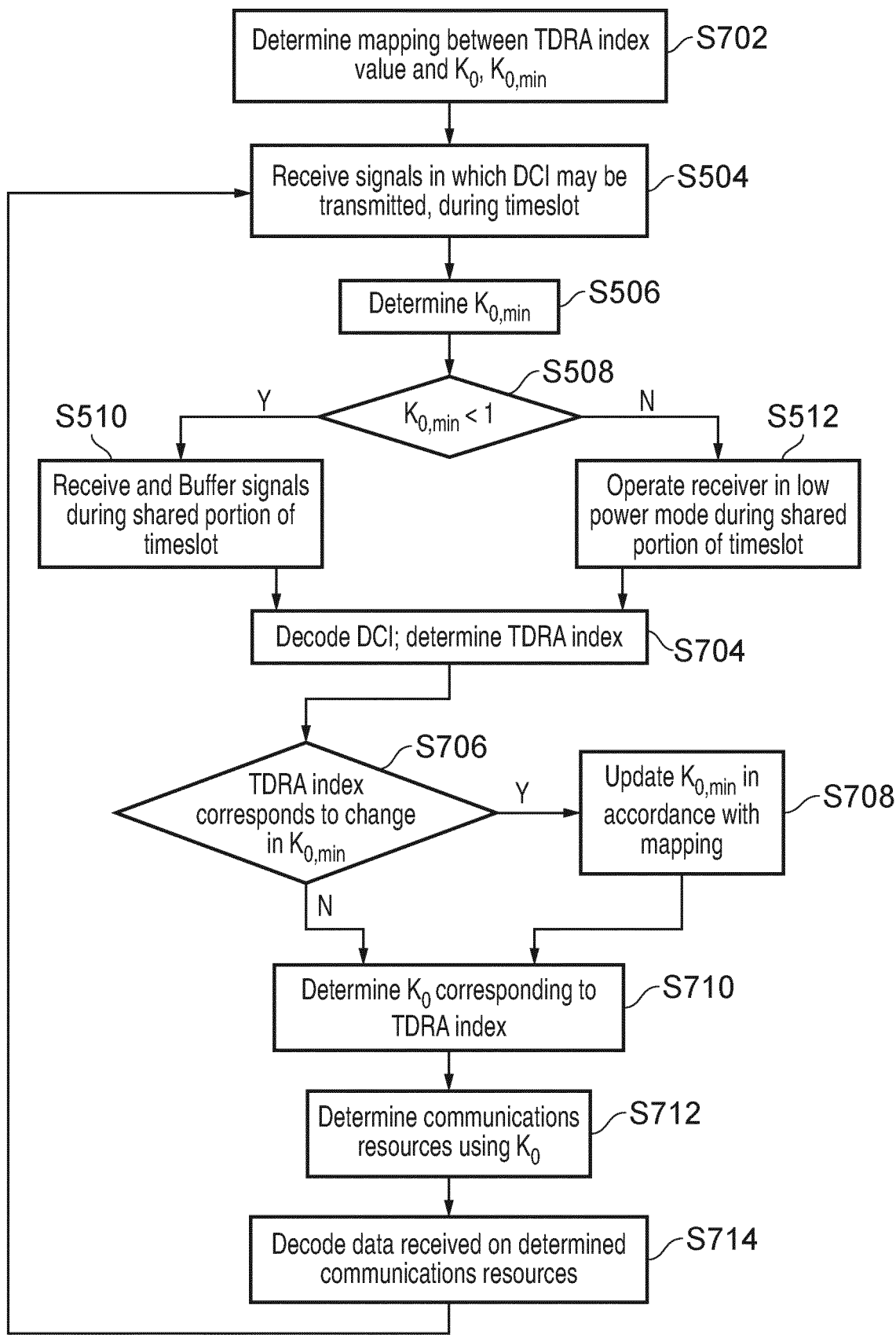
FIG. 7 illustrates a further process which may be carried out by a communications device in accordance with embodiments of the present technique.

FIG. 7 illustrates a process which may be carried out by the communications device 270 in accordance with embodiments of the present technique.

The process of FIG. 7 starts at step S702, in which the communications device 270 determines a mapping between row numbers (or indices) of a TDRA table and their corresponding $K_0$ values and $K_{0,min}$ values. An example of the mapping determined in step S702 is shown in Table 1. As described above, the TDRA table may comprise indications of other parameters, such as S and L parameters described above.

Following step S702, the communications device 270 receives signals corresponding to downlink control information. The process for receiving the DCI signals may correspond substantially to steps S504, S506, S508, S510, and step S512 illustrated in the process of FIG. 5 and described above. Following steps S510 and S512 in the process of FIG. 7, control passes to step S704, in which the communications device 270 decodes the DCI and determines the TDRA row index indicated by the DCI. Accordingly in step S704, the communications device 270 also determines the $K_0$ value corresponding to the indicated TDRA row index in accordance with the mapping determined at step S702.

TABLE 1

Example of Indication of Minimum K0 in TDRA table

| TDRA row number | $K_0$ | Minimum $K_0$ ($K_{0,\ min}$) |
|---|---|---|
| 0 | 0 | Unchanged |
| 1 | 1 | Unchanged |
| 2 | 1 | 0 |
| 3 | 2 | Unchanged |
| 4 | 2 | 0 |

Control then passes to step S706, in which the communications device 270 determines whether the indicated TDRA table row corresponds to a request by the infrastructure equipment for the communications device 270 to change the value of $K_{0,min}$. This may be based on the mapping of the TDRA row index to $K_{0,min}$ value determined at step S702. If the outcome of the determination is that the $K_{0,min}$ value is to be changed then control passes to step S708, in which $K_{0,min}$ is updated in accordance with the mapping determined at step S702. Following step S708, and following step S706 in the case where the $K_{0,min}$ value is not to be changed, control passes to step S710.

In step S710, the communications device 270 determines the $K_0$ value and other parameters based on the indicated TDRA table row and the mapping determined at step S702. Control then passes to step S712, in which the communications device 270 determines downlink communication resources corresponding to the indicated $K_0$ and other values determined at step S710. Control then passes to step S714, in which the communications device 270 decodes data in accordance with the determined downlink resources determined at step S712. The process may continue by returning to step S504.

In the example mapping shown in Table 1, each row is associated with either no change to the $K_{0,min}$ value or with a change of the $K_{0,min}$ to 0. However, it will be appreciated that in some embodiments, one or more rows may be associated with a change of $K_{0,min}$ to different (non-zero) values, such as one, in order to indicate that subsequent DCIs will allocate communications resources by means of cross-slot scheduling.

Figure 8:
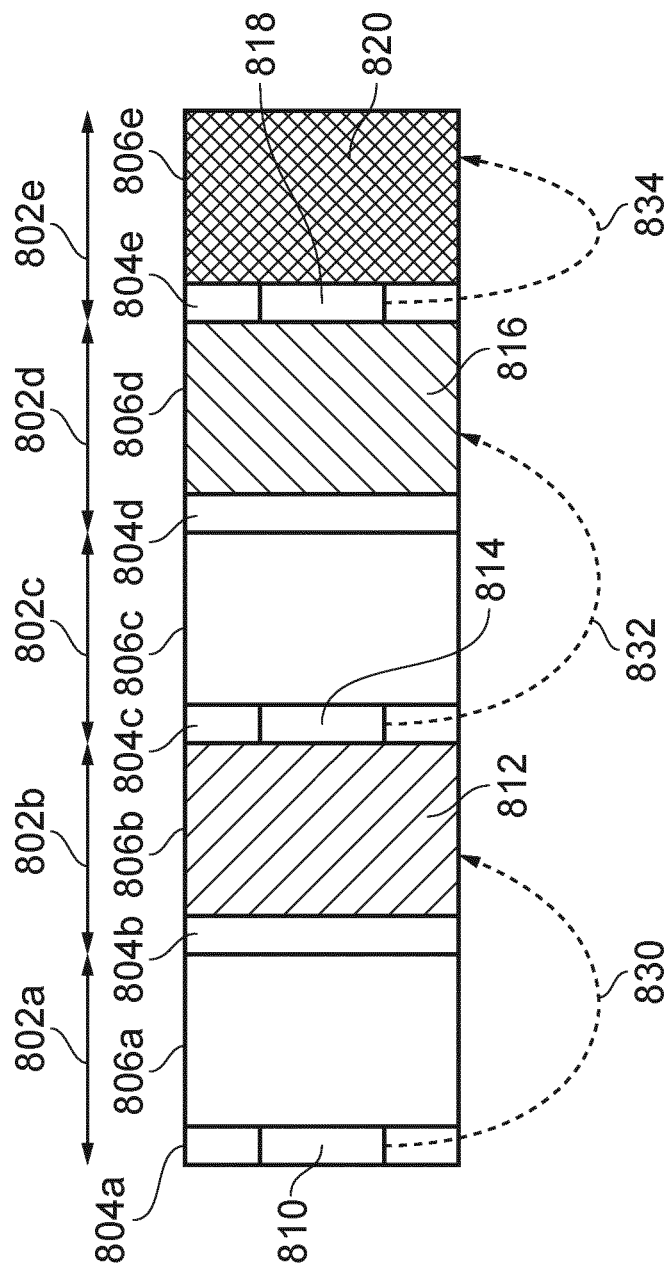
FIG. 8 illustrates a sequence of downlink transmissions showing downlink control information and data transmissions in accordance with embodiments of the present technique, which may arise in accordance with the process illustrated in FIG. 7.

FIG. 8 illustrates a sequence of downlink transmissions showing downlink control information and data transmissions in accordance with embodiments of the present technique. The downlink portion of the wireless access interface is divided into time slots 802a-802e each of which is divided into a control portion 804 and a shared portion 806. In the example of FIG. 8, the communications device first determines a mapping of TDRA index values to $K_0$ and to indications of a change (or of no change) to the $K_{0,min}$ value as shown in Table 1 above.

During the control portion 804a of the first time slot 802a the communications device 270 receives a first DCI 810. At the start of the first time slot 802a the $K_{0,min}$ value for the communications device is 1 and accordingly during the shared portion 806a of the first time slot 802a, the communications device 270 enters a low power mode of operation and does not receive or buffer signals transmitted during the shared portion 806a of the first time slot 802a. The communications device 270 decodes the first DCI 810 and determines that the TDRA index indicated by the first DCI is 1. Based on the mapping shown in Table 1, the communications device 270 determines that the indicated $K_0$ value is 1 and that the minimum $K_0$ value $K_{0,min}$ is unchanged. The communications device 270 accordingly receives and decodes data transmitted using downlink communication resources 812 during the shared portion 806b of the second time slot 802b.

In the control portion 804c of the third time slot 802c, the communications device 270 receives a second DCI 814. Again because the $K_{0,min}$ value of the communications device is 1, the communications device 270 does not receive or decode signals transmitted during the shared portion 806c of the third time slot 802c.

The communications device 270 subsequently decodes the second DCI 814 and determines that the TDRA index value indicated by the second DCI 814 is equal to 2. In accordance with the predetermined mapping shown in Table 1, this corresponds to a $K_0$ value of 1 and a change to the $K_{0,min}$ value to 0. Based on the $K_0$ value of 1, the communications device receives and decodes data transmitted using the shared portion 806d of the fourth time slot 802d. Furthermore based on the indication that the $K_{0,min}$ value is to be changed to 0, the communications device 270 updates its $K_{0,min}$ value to 0.

Subsequently during the control portion 804e of the fifth time slot 802e, the communications device receives a third DCI 818. Because the $K_{0,min}$ value of the communications device is now 0, the communications device 270 receives and buffers signals transmitted during the shared portion 806e of the fifth time slot 802e while it decodes the third DCI 818. The communications device determines that the third DCI 818 comprises an indication of a TDRA row index of 0. According to the predetermined mapping shown in Table 1, row 0 corresponds to a $K_0$ value of 0 and no change to the $K_{0,min}$ value. Based on the $K_0$ value of 0, the communications device decodes the received and buffered signals transmitted during the shared portion 806e of the fifth time slot 802e data signals.

It will thus be apparent that in accordance with embodiments of the present technique the second DCI 814 permits the infrastructure equipment to indicate to the communications device both that the minimum $K_0$ value $K_{0,min}$ is to be changed and to schedule downlink communications resources for the transmission of data to the communications device 270 using a single DCI.

In some embodiments, determining the mapping between TDRA index value and parameters indicating $K_0$ and a change to the $K_{0,min}$ value comprises receiving an RRC configuration message comprising a representation of a table, such as Table 1.

In some embodiments, determining the mapping between TDRA index value and parameters indicating $K_0$ and a change to the $K_{0,min}$ value comprises receiving an RRC configuration message comprising a representation of a table, such as Table 1 (that is, not including an indication of any changes to the $K_{0,min}$ value) and receiving an indication (either in the same RRC configuration message, or separately) of a mapping between row/index value and change to the $K_{0,min}$ value. For example, the separate indication may comprise a list of rows/indices which correspond to an indication that the $K_{0,min}$ value should be set to 0.

Change of $K_{0,min}$ Based on Timer Expiry

In some embodiments of the present technique, the communications device 270 adjusts its $K_{0,min}$ value based on a history of previously-received DCIs.

In some embodiments, $K_{0,min}$ is changed to preclude a particular mode of resource allocation (e.g. cross-slot or same-slot) in response to a determination that no DCI allocating communications resources to the communications device in accordance with that particular mode has been received for a period having a duration exceeding a predetermined threshold.

For example, when the current $K_{0,min}=0$, permitting same-slot scheduling, then the communications device 270 may adjust $K_{0,min}$ to 1 (i.e. requiring cross-slot scheduling and precluding same-slot scheduling) if no DCI has allocated communications resources for the transmission of data to the communications device using same-slot scheduling (i.e. where $K_0=0$) in a previous time period of predetermined duration.

Figure 9:
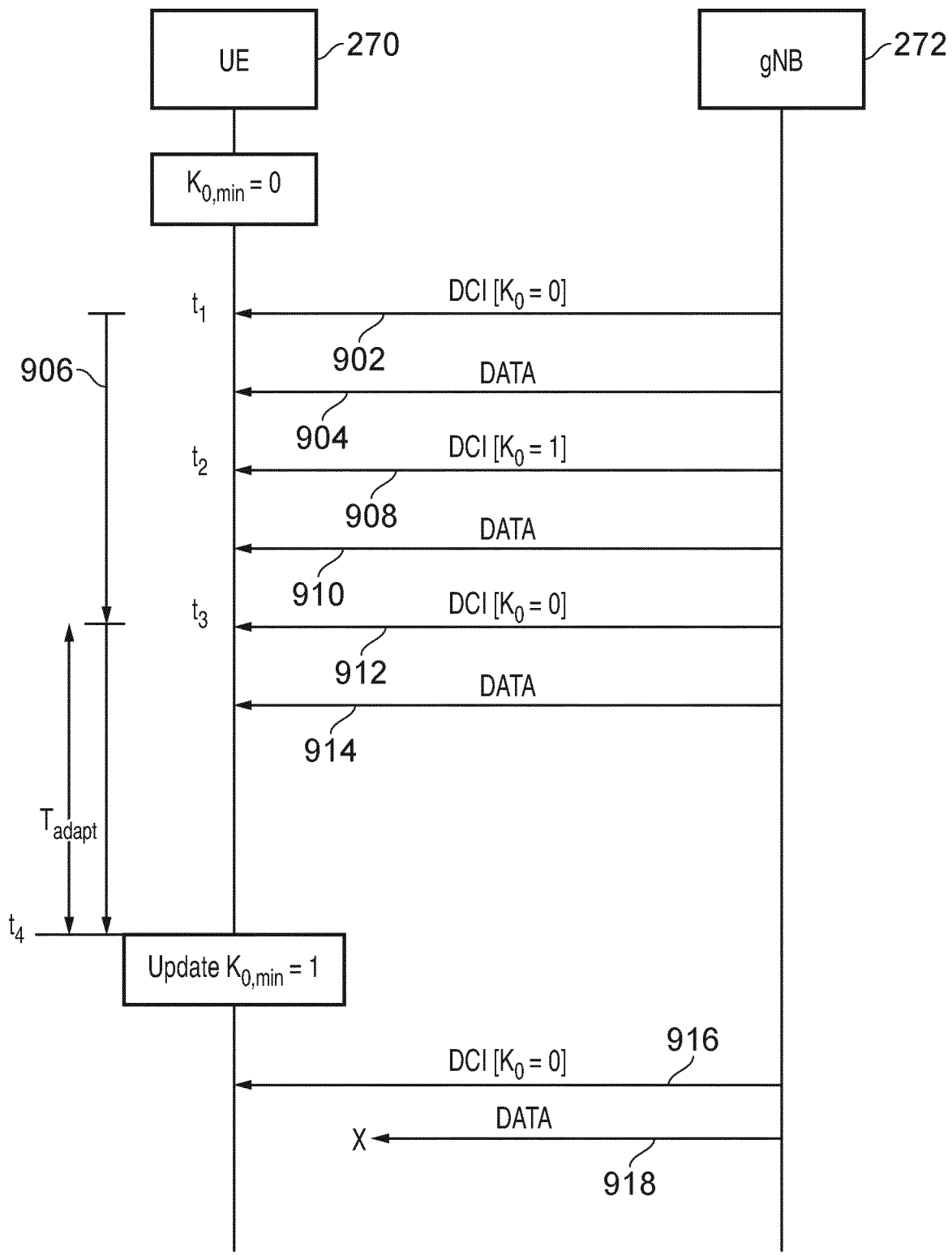
FIG. 9 illustrates an example of a message sequence chart illustrating transmissions and processes in accordance with embodiments of the present technique.

An example of a message sequence chart illustrating such an embodiment is shown in FIG. 9.

Initially, in the example of FIG. 9, $K_{0,min}=0$, that is, the communications device 270 operates such that it can receive data transmitted using resources allocated by same-slot scheduling. The communications device 270 first determines a time period $T_{adapt}$.

At time t1, the communications device 270 receives a DCI 902 allocating communications resources using same-slot scheduling, i.e. with $K_0=0$. In response to receiving the DCI 902, the communications device 270 starts a timer 906 having a duration of $T_{adapt}$. Based on the DCI 902, the communications device receives and decodes data 904 transmitted using the communications resources indicated by the DCI 902.

Subsequently at time t2, a DCI 908 is received allocating communications resources for the transmission of downlink data 910. However, the DCI 908 uses cross-slot scheduling (i.e. $K_0>0$). Accordingly, the timer 906 is not restarted.

At time t3, a DCI 912 is received allocating communications resources for the transmission of downlink data 914. The DCI 912 uses same-slot scheduling (i.e. $K_0=0$) and the timer 906 is restarted.

No further DCI is received using same-slot scheduling before time t4 (where $t4=t3+T_{adapt}$) In response to determining that the timer 906 has expired at time t4, the communications device 270 updates its $K_{0,min}$ value to a new value of $K_{0,min}$, and subsequently operates in a mode in which data transmitted in downlink communications resources allocated by means of same-slot scheduling will not be received. This is illustrated in FIG. 9 by DCI 916 which (inconsistent with the current setting of the communications device) allocates communications resources for the transmission of downlink data using same-slot scheduling (i.e. using $K_0=0$). As indicated by the 'x', the communications device fails to receive the downlink data 918 transmitted using the resources indicated by the DCI 916.

In some embodiments, the new $K_{0,min}$ value, i.e. the value of $K_{0,min}$ after timer expiry, is set to a predetermined value, such as a default $K_0$ value $K_{0,default}$, which may be configured or determined as described above.

In some embodiments, the new $K_{0,min}$ value is set to a value of a most recent value of $K_0$, which exceeds the current $K_{0,min}$ value, indicated by a DCI comprising an indication of communications resources scheduled for the transmission of downlink data to the communications device. In some embodiments, the new $K_{0,min}$ value may be set in this manner only if the DCI was received within the time period having a duration equal to the length of the timer and ending at the timer expiry time.

In some embodiments, if the timer expires and no DCI comprising an indication of communications resources scheduled for the transmission of downlink data to the communications device 270 while the timer was running, then the new $K_{0,min}$ value is set to the predetermined value, such as the default $K_0$ value $K_{0,default}$.

Change of $K_{0,min}$ Based on $K_0$ Values Indicated in Previous DCIs

In some embodiments, the communications device 270 maintains a count of $K_0$ values indicated by previously received DCIs which allocate communications resources for the transmission of downlink data to the communications device.

In some embodiments, a cross-slot counter $N_{cross}$ is maintained to count a number of received DCIs comprising an indication of $K_0>0$. $N_{cross}$ is incremented each time a DCI is received comprising an indication of $K_0>0$. In some embodiments, a same-slot counter $N_{same}$ is maintained for the number of received DCIs comprising an indication of $K_0=0$, which is incremented each time a DCI is received comprising an indication of $K_0=0$.

When pre-determined conditions relating to the value of one or both counters are satisfied, the value of $K_{0,min}$ is updated.

Various options within the scope of the present disclosure are now described.

In some embodiments, $N_{cross}$ is reset to zero if a DCI is received comprising an indication of $K_0=0$. If $N_{cross}$ exceeds a predetermined threshold, then $K_{0,min}$ is updated to a value greater than 0.

In some embodiments, both counters are reset to zero if $N_{same}$ exceeds a predetermined threshold.

In some embodiments, $K_{0,min}$ is updated to a value greater than 0 if $(N_{cross}-N_{same})$ exceeds a predetermined threshold.

In some embodiments, $K_{0,min}$ is updated to a value greater than 0 if $N_{cross}$ exceeds a predetermined threshold and (at the same time) $N_{same}$ is less than a predetermined same-slot maximum threshold, which in some embodiments is equal to 1. In some embodiments, if $N_{same}$ is equal to the same-slot maximum threshold, then both $N_{same}$ and $N_{cross}$ are reset to zero.

When the value of $K_{0,min}$ is updated based on the predetermined conditions being satisfied, it may be updated to a predetermined value, such as 1. The predetermined value may be the default value $K_{0,default}$ described above.

Uplink Slot Gap Delay Parameter $K_2$

The $K_0$ parameter described above specifies a delay in time slots between the transmission time of a control message allocating downlink communications resources and the start time of those downlink communications resources.

A corresponding parameter $K_2$ may define a delay in time slots between the transmission time of a control message allocating uplink communications resources and the start time of those uplink communications resources. Similarly, a $K_{2,min}$ parameter may specify a minimum permitted value of $K_2$, such that the communications device 270 may control its processor and transmitter accordingly. For example, where $K_{2,min}$ is a relatively high value, uplink data may be formed and encoded using less (instantaneous) processing power and corresponding lower power consumption.

In some embodiments of the present disclosure, the communications device 270 determines the minimum $K_2$ value, $K_{2,min}$, based on a most recently transmitted buffer status indication transmitted by the communications device 270 to the infrastructure equipment 272. The buffer status indication may be a buffer status report (BSR).

In some embodiments, if the most recently transmitted buffer status indication indicated that the quantity of uplink data buffered for transmission exceeds a predetermined threshold, then $K_{2,min}$ may be set to a first value (e.g. 1). If the most recently transmitted buffer status indication indicated that the quantity of uplink data buffered for transmission is less than the predetermined threshold, then $K_{2,min}$ may be set to a second value (e.g. 2), the second value being higher than the first value. In some embodiments, one or both of the first and second values may be specified in a standard, or configured at the communications device 270 by means of control signalling from the infrastructure equipment 272 (such as RRC configuration signalling).

In some embodiments, a buffer status indication may be associated with data associated with a particular logical channel. Accordingly, multiple buffer status indications may be transmitted, to indicate the quantity of buffered uplink data associated with each logical channel.

In some embodiments, $K_{2,min}$ is set based on a plurality of buffer status indications, where each of the plurality of buffer status indications corresponds to a different logical channel.

In some embodiments, logical channels are grouped according to a priority and/or quality of service associated with the corresponding data and $K_{2,min}$ is set based on the set of buffer status indications corresponding to logical channels in the same group.

For example, in some embodiments, the communications device 270 sets $K_{2,min}$ to the second value if, according to the most recently sent corresponding buffer status indications, the quantity of buffered data associated with each logical channel in a group of logical channels associated with high priority and/or low latency requirements is below a predetermined threshold.

In some embodiments, if, on the other hand, the quantity of buffered data associated with any one of the logical channels in the group of logical channels associated with high priority and/or low latency requirements is above the predetermined threshold, then the communications device 270 sets $K_{2,min}$ to the first value.

In some embodiments, the grouping of logical channels is in accordance with specifications. For example, each logical channel may be associated with a quality of service (QoS) class identifier (QCI) in accordance with conventional techniques. In some embodiments, the specifications defining characteristics of each QCI further specify a QCI group, such that logical channels are in the same group if they are associated with QCI values which are in the same QCI group.

In some embodiments, the grouping of logical channels may be controlled by means of RRC signalling.

Accordingly, embodiments of the present technique can provide for dynamic adjustment of a $K_{2,min}$ parameter based on an amount of buffered uplink data at the communications device 270.

Setting of $K_{0,min}$ Based on DRX Cycles

Conventionally, a communications device (such as the communications device 270) is configured to enter a discontinuous reception (DRX) mode periodically in order to permit reduced power operation. For example, during a DRX 'off' period, the infrastructure equipment 272 may operate to refrain from allocating communications resources for the transmission of uplink or downlink data by or to the communications device 270. Accordingly, the communications device 270 may refrain from attempting to receive and decode downlink transmissions which may allocate uplink or downlink communications resources for the transmission of data to or from the communications device.

The communications device 270 may thus operate in a reduced power consumption mode during each DRX off period. For example, it may, during each DRX off period, disable portions of an RF receiver chain.

Each DRX off period separates DRX ON periods, during which data may be scheduled for transmission to or by the communications device.

Embodiments of the present technique provide methods for determining the $K_{0,min}$ parameter to be used at the start of a DRX ON period.

In some embodiments, the $K_{0,min}$ parameter to be used at the start of a DRX ON period is equal to the $K_0$ value indicated in a most recent DCI allocating communications resources for the transmission of downlink data to the communications device in a most recent previous DRX ON period.

As described above, each row or index of a TDRA table is associated with a $K_0$ value. In some embodiments, one or more rows or indices of a TDRA table are also associated, according to a predetermined mapping, with an 'no further DL data' indication that indicates that no further downlink communications resources are to be allocated to the communications device during the present DRX ON period. When a DCI is received comprising an indication of a TDRA row/index associated with a 'no further DL data' indication, the $K_{0,min}$ parameter to be used at the start of the next DRX ON period is equal to the $K_0$ value indicated by the TDRA row/index. In some such embodiments, in response to receiving an indication of a TDRA row/index associated with a 'no further DL data' indication, the communications device 270 may (after receiving any data transmitted using communications resources allocated by the DCI) enter a DRX off period.

In some embodiments, the $K_{0,min}$ parameter to be used at the start of a DRX ON period is equal to a predetermined $K_{0,min}$(DRX_ON) value.

In some embodiments, the $K_{0,min}$ parameter to be used at the start of a DRX ON period depends on DCIs received during the preceding DRX ON periods. For example, in some embodiments, if the UE has not received a scheduling DCI during any of a predetermined number of previous DRX_ON cycles, the $K_{0,min}$ parameter to be used at the start of a next DRX ON period is equal to the predetermined $K_{0,min}$ (DRX_ON) value.

In some embodiments, the $K_{0,min}$ parameter to be used at the start of a DRX ON period depends on whether the communications device has changed its $K_{0,min}$ parameter during the preceding DRX ON periods. For example, if the $K_{0,min}$ parameter has not been changed in any of a predetermined number of previous DRX_ON cycles, the $K_{0,min}$ parameter to be used at the start of a next DRX ON period is equal to the predetermined $K_{0,min}$(DRX_ON) value. The predetermined $K_{0,min}$(DRX_ON) value may be, for example, the default $K_0$ parameter value $K_{0,default}$ described above or may be a value corresponding to a cross-slot mode of operation (e.g. $K_{0,min}$=1).

In some embodiments in which a cross slot counter $N_{cross}$ and/or a same-slot counter $N_{same}$ are maintained, these counters may be reset to zero at the start of each DRX ON period.

Control of PDCCH Monitoring

In some embodiments, the communications device is configured to be capable of operating in a multi-cell mode. In the multi-cell mode, the communications device may be required to maintain synchronisation with two or more 'active cells'. Communications resources of a cell can be allocated for transmission of data to or by the communications device only if that cell is an active cell.

The multi-cell mode may additionally or alternatively be characterised by a set of cells, whose control portion must be monitored for PDCCH transmissions to the communications device. Communications resources may be allocated for transmission of data to or by the communications device even if that cell is not monitored for PDCCH transmissions. The communications device may need to maintain synchronisation with all of the cells on which it might be allocated PDSCH resource.

Embodiments of the present technique can provide for efficient control and/or indication of the set of cells which a communications device is required to monitor for PDCCH transmissions.

In some embodiments, allocation of communications resources on a cell implicitly indicates that the communications device is to begin monitoring for control channel transmissions (e.g. PDCCH transmissions) on that cell, if it is not already doing so. For example, referring to FIG. 2, if the communications device 260 initially monitors the first cell 201 for PDCCH transmissions and receives a DCI transmitted on the first cell 201, indicating that downlink communications resources are allocated for the transmission of data to the communications device 260 in the second cell 202, then in response, the communications device 260 initiates monitoring of control portions of a wireless access interface provided in the second cell 202, so that it can receive PDCCH transmissions in the second cell 202.

In some embodiments, the communications device 260, currently monitoring for PDCCH transmissions only in the first cell, initiates monitoring the control portions of the wireless access interface provided in the second cell 202 for receiving PDCCH transmissions only if it receives a number of PDSCH allocations on the second cell which exceeds a predetermined multi-cell PDCCH monitoring threshold, within a predetermined time period.

One or both of the predetermined multi-cell PDCCH monitoring threshold and the predetermined time period may be specified in a standard, and/or may be indicated to the communications device 260 in RRC signalling.

Embodiments may also provide criteria when the communications device 260 stops monitoring for PDCCH transmissions in a particular cell.

For example, in some embodiments, a cell may be designated (e.g. by RRC signalling) as a secondary cell. If the communications device is monitoring the secondary cell for PDCCH transmissions, and the communications device receives a PDCCH transmission on that secondary cell comprising DCI scheduling communications resources on a different cell, then the communications device 260 stops monitoring the secondary cell.

In some embodiments, if the communications device receives a number of PDCCH transmission on the secondary cell scheduling communications resources on a different cell, then the communications device stops monitoring this secondary cell when the number exceeds a predetermined threshold.

In some embodiments, the communications device stops monitoring the secondary cell only if the different cell (on which communications resources are allocated) is a cell designated as a default (or primary) cell.

Control of Set of Active Cells

Some embodiments of the present technique provide for the control of the set of active cells associated with a communications device.

In some embodiments, the communications device determines that a cell is no longer in the set of active cells in response to determining that a time period since the communications device was most recently allocated communications resources on that cell exceeds a predetermined time period. The determining may be based on a timer, which is (re-)started when the communications device is allocated communications resources on the cell, and expires after the predetermined time period.

In some embodiments, the communications device may not currently be monitoring (i.e. maintaining synchronisation with) a cell (e.g. a secondary cell). The communications device may determine that the cell is to be added to the set of active cells in response to receiving DCI on a PDCCH on another cell (e.g. a default cell) which schedules communications resources on a PDSCH of the cell.

Since the communications device is not synchronised with the newly active cell, then in some such embodiments, the communications device initiates monitoring the cell, but does not actually receive or decode data transmitted on the indicated PDSCH communications resources of the secondary cell. Alternatively, in some embodiments, the allocated communications resources on the newly activated cell occur at a default time after the PDCCH, or at a time that is offset by a predetermined amount from the time that is indicated in the PDCCH.

As described above, a delay between a PDCCH transmission and the start of downlink communications resources allocated by DCI transmitted using the PDCCH may be indicated by means of a TDRA table. However, conventionally, the possible times are limited due to the limited size of the TDRA table, and may be relatively short in order to reduce latency for downlink data.

The use of a default delay (relative to the PDCCH) or a predetermined offset (relative to the time indicated by the TDRA table) allows the communications device to acquire synchronisation of the newly activated cell and to receive the downlink data.

In some embodiments, the predetermined offset may be indicated by the infrastructure equipment in RRC signalling transmitted to the communications device, or may be specified in applicable standards specifications.

Infrastructure Equipment

In the examples described above, processes for a communications device have been described. However, it will be appreciated that within the scope of the present disclosure are corresponding infrastructure equipment and methods therefore. For example, in some embodiments, steps corresponding to some or all of the steps of the process illustrated in FIG. 7 and described above may be carried out by the infrastructure equipment 272.

Specifically, for example, in step S702, the communications device 270 may determine the significance of each TDRA table row/index based on one or more transmissions of RRC signalling by the infrastructure equipment 272. Similarly, scheduling of allocated communications resources for the transmission of downlink data to the communications device 270 may comprise determining, by the infrastructure equipment, the current value of $K_{0,min}$ for the communications device 270, and determining whether communications resources within the same slot as a DCI allocating the communications resources may be scheduled.

In some embodiments, the infrastructure equipment 272 may determine that the current value of K0,min for the communications device 270 corresponds to cross-slot scheduling (i.e. precludes same-slot scheduling) and that downlink data having a low latency requirement is available for transmission to the communications device 270. In response to this determination, the infrastructure equipment may determine that the K0,min value for the communications device 270 should be modified to permit same-slot scheduling. This modification may be by means of the transmission of DCI in accordance with embodiments of the present technique as described above. In particular, the DCI comprising an indication that the K0,min is to be changed may also comprise an indication of communications resources on which downlink data is to be transmitted to the communications device 270.

Examples described above may be combined, and/or modified. For example, within the scope of the present disclosure, one or more of the processes described above may be modified by the re-ordering, modifying or omission of certain steps, and such processes may be combined in some embodiments.

Thus there has been described a method of receiving downlink control information by a communications device from a wireless communications network, the method comprising: receiving, via a time divided wireless access interface provided by the wireless communications network, downlink control information (DCI) messages providing an indication of allocated communications resources, the DCIs including a slot gap parameter (K0) indicating a time slot gap between a timeslot in which the DCI is received and the allocated communications resources, wherein the receiving comprises receiving a current DCI which includes a slot gap parameter for currently allocated communications resources, determining that the slot gap parameter for the currently allocated communications resources is less than a current minimum slot gap value, the current minimum slot gap value defining a minimum value of the slot gap parameter which can be allocated by a DCI, and in response to determining that the indicated slot gap parameter is less than the current minimum slot gap value, using a default slot gap value to detect data from communications resources of the wireless access interface, and updating the current minimum slot gap value.

There has also been described a method of receiving downlink control information by a communications device from a wireless communications network, the method comprising: receiving, via a time divided wireless access interface provided by the wireless communications network, downlink control information (DCI) messages providing an indication of allocated communications resources, the DCIs including a slot gap (K0) indicating a time slot gap between a timeslot in which the DCI is received and the allocated communications resources, wherein the receiving comprises receiving a current DCI which includes a slot gap parameter for currently allocated communications resources and an indication of a minimum slot gap value defining an earliest timeslot in which communications resources can be allocated by means of a downlink control message, and using the slot gap parameter to detect data from communications resources of the wireless access interface, and updating a current minimum slot gap value in accordance with the indicated minimum slot gap value, the current minimum slot gap value defining an earliest time slot in which communications resources can be allocated by means of a DCI.

There has also been described a method of receiving downlink control information by a communications device from a wireless communications network, the method comprising: receiving, via a time divided wireless access interface provided by the wireless communications network, downlink control information (DCI) messages providing an indication of allocated communications resources, the DCIs including a slot gap (K0) indicating a time slot gap between a timeslot in which the DCI is received and the allocated communications resources, wherein the receiving comprises receiving in a time slot a current DCI which includes a slot gap parameter for currently allocated communications resources determining based on the slot gap parameter that the currently allocated communications resources are in the same time slot as the time slot in which the current DCI is received, and in response to determining that the currently allocated communications resources are in the same time slot as the time slot in which the current DCI is received, starting a timer for a predetermined duration, determining that the timer has expired, and in response to determining that the timer has expired, updating a current minimum slot gap value to define an earliest timeslot in which communications resources can be allocated by means of a DCI as a timeslot later than a timeslot in which the DCI is transmitted.

There has also been described a method of receiving downlink control information by a communications device from a wireless communications network, the method comprising: receiving, via a time divided wireless access interface provided by the wireless communications network, downlink control information (DCI) messages providing an indication of allocated communications resources, the DCIs including a slot gap (K0) indicating a time slot gap between a timeslot in which the DCI is received and the allocated communications resources, wherein the receiving comprises receiving in a time slot a current DCI which includes a slot gap parameter for currently allocated communications resources determining based on the slot gap parameter that the currently allocated communications resources are in a time slot later than the time slot in which the current DCI is received, and in response to determining that the currently allocated communications resources are in a time slot later than the time slot in which the current DCI is received, increasing a cross slot counter, determining that the value of the cross-slot counter has exceeded a predetermined threshold, and in response to determining that the value of the cross slot counter has exceeded a predetermined threshold, updating a current minimum slot gap value to define an earliest timeslot in which downlink communications resources can be allocated by means of a DCI as a timeslot later than a timeslot in which the DCI is transmitted.

There has also been described a method of receiving data by a communications device from a wireless communications network, the method comprising: during a discontinuous reception (DRX) off period, controlling a receiver of the communications device to operate in a reduced power consumption mode, wherein during the DRX off period, the communications device is not required to decode downlink control information allocating communications resources for the transmission of downlink data to the communications device, determining that the DRX off period has ended, determining that a minimum slot gap parameter value defining an earliest timeslot in which communications resources can be allocated by means of a downlink control message is to be changed, after the DRX off period has ended, receiving a downlink control message transmitted in a first timeslot of a wireless access interface provided by the wireless communications network, the downlink control message comprising an indication of a slot gap parameter value, the slot gap parameter value indicating a delay between the first timeslot and a second timeslot in which communications resources are allocated for the transmission of data by the wireless communications network to the communications device, and controlling the receiver of the communications device to receive signals representing the data in accordance with the changed minimum slot gap value.

There has also been described a method of transmitting data by a communications device in a wireless communications network, the method comprising: transmitting via a time divided wireless access interface provided by the wireless communications network, a buffer status indication, the buffer status indication indicating a quantity of uplink data which is available for transmission by the communications device, determining, based on the quantity of uplink data indicated by the buffer status indication, a minimum slot gap parameter defining an earliest timeslot in which uplink communications resources can be allocated by means of a downlink control information (DCI) message, receiving, via the wireless access interface a DCI message providing an indication of allocated communications resources, the DCI including a slot gap (K2) indicating a time slot gap between a timeslot in which the DCI is received and the allocated communications resources, wherein the allocated communications resources occur in a timeslot which is compliant with the determined minimum slot gap parameter, and controlling the communications device to transmit the data using the allocated communications resources in accordance with the determined minimum slot gap parameter.

Corresponding communications devices, infrastructure equipment and methods therefore, and circuitry for a communications device and circuitry for infrastructure equipment have also been described.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to URLLC/IIoT devices or other low latency communications devices, but can be applied more generally, for example in respect of any type of communications device operating with a wireless link to the communication network.

It will further be appreciated that the principles described herein are applicable not only to LTE-based or 5G/NR-based wireless telecommunications systems, but are applicable for any type of wireless telecommunications system that supports a dynamic scheduling of shared communications resources.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of receiving downlink control information by a communications device from a wireless communications network, the method comprising: receiving, via a time divided wireless access interface provided by the wireless communications network, downlink control information (DCI) messages providing an indication of allocated communications resources, the DCIs including a slot gap parameter (K0) indicating a time slot gap between a timeslot in which the DCI is received and the allocated communications resources, wherein the receiving comprises receiving a current DCI which includes a slot gap parameter for currently allocated communications resources, determining that the slot gap parameter for the currently allocated communications resources is less than a current minimum slot gap value, the current minimum slot gap value defining a minimum value of the slot gap parameter which can be allocated by a DCI, and in response to determining that the indicated slot gap parameter is less than the current minimum slot gap value, using a default slot gap value to detect data from communications resources of the wireless access interface, and updating the current minimum slot gap value.

Paragraph 2. A method according to paragraph 1, wherein updating the current minimum slot gap value comprises setting the current minimum slot gap value to the slot gap parameter in the current DCI.

Paragraph 3. A method of receiving downlink control information by a communications device from a wireless communications network, the method comprising: receiving, via a time divided wireless access interface provided by the wireless communications network, downlink control information (DCI) messages providing an indication of allocated communications resources, the DCIs including a slot gap (K0) indicating a time slot gap between a timeslot in which the DCI is received and the allocated communications resources, wherein the receiving comprises receiving a current DCI which includes a slot gap parameter for currently allocated communications resources and an indication of a minimum slot gap value defining an earliest timeslot in which communications resources can be allocated by means of a downlink control message, and using the slot gap parameter to detect data from communications resources of the wireless access interface, and updating a current minimum slot gap value in accordance with the indicated minimum slot gap value, the current minimum slot gap value defining an earliest time slot in which communications resources can be allocated by means of a DCI.

Paragraph 4. A method of receiving downlink control information by a communications device from a wireless communications network, the method comprising: receiving, via a time divided wireless access interface provided by the wireless communications network, downlink control information (DCI) messages providing an indication of allocated communications resources, the DCIs including a slot gap (K0) indicating a time slot gap between a timeslot in which the DCI is received and the allocated communications resources, wherein the receiving comprises receiving in a time slot a current DCI which includes a slot gap parameter for currently allocated communications resources determining based on the slot gap parameter that the currently allocated communications resources are in the same time slot as the time slot in which the current DCI is received, and in response to determining that the currently allocated communications resources are in the same time slot as the time slot in which the current DCI is received, starting a timer for a predetermined duration, determining that the timer has expired, and in response to determining that the timer has expired, updating a current minimum slot gap value to define an earliest timeslot in which communications resources can be allocated by means of a DCI as a timeslot later than a timeslot in which the DCI is transmitted.

Paragraph 5. A method of receiving downlink control information by a communications device from a wireless communications network, the method comprising: receiving, via a time divided wireless access interface provided by the wireless communications network, downlink control information (DCI) messages providing an indication of allocated communications resources, the DCIs including a slot gap (K0) indicating a time slot gap between a timeslot in which the DCI is received and the allocated communications resources, wherein the receiving comprises receiving in a time slot a current DCI which includes a slot gap parameter for currently allocated communications resources determining based on the slot gap parameter that the currently allocated communications resources are in a time slot later than the time slot in which the current DCI is received, and in response to determining that the currently allocated communications resources are in a time slot later than the time slot in which the current DCI is received, increasing a cross slot counter, determining that the value of the cross-slot counter has exceeded a predetermined threshold, and in response to determining that the value of the cross slot counter has exceeded a predetermined threshold, updating a current minimum slot gap value to define an earliest timeslot in which downlink communications resources can be allocated by means of a DCI as a timeslot later than a timeslot in which the DCI is transmitted.

Paragraph 6. A method according to paragraph 5, wherein the receiving comprises receiving a second DCI which includes a second slot gap parameter for second allocated communications resources, determining based on the second slot gap parameter that the second allocated communications resources are in the same time slot as the time slot in which the second DCI is received, and in response to determining that the second allocated communications resources are in the same time slot as the time slot in which the second DCI is received, resetting the cross-slot counter.

Paragraph 7. A method according to any of paragraphs 1 to 6, the method comprising operating in either a cross slot mode in which communications resources allocated by a DCI are in a later time slot than the time slot in which the DCI is received or a same slot mode in which the communications resources are in the same time slot as the DCI.

Paragraph 8. A method according to paragraph 7, wherein when the current minimum slot gap value is zero, operating in the same slot mode, and when the current minimum slot gap value is greater than zero, operating in the cross slot mode.

Paragraph 9. A method according to paragraph 7 or paragraph 8, wherein operating in the cross slot mode comprises operating a receiver of the communications device to receive a DCI in a first portion of a time slot, and operating the receiver in a reduced power consumption mode during a second portion of the time slot after the first portion.

Paragraph 10. A method according to paragraph 9, wherein operating the receiver in the reduced power consumption mode comprises disabling one or more radio frequency (RF) components within the receiver.

Paragraph 11. A method according to any of paragraphs 1 to 10, wherein operating in the same slot mode comprises operating a receiver of the communications device to receive a DCI in a first portion of a time slot, and operating the receiver to receive and store signals transmitted using communications resources which may be allocated by the DCI during a second portion of the time slot after the first portion.

Paragraph 12. A method of receiving data by a communications device from a wireless communications network, the method comprising: during a discontinuous reception (DRX) off period, controlling a receiver of the communications device to operate in a reduced power consumption mode, wherein during the DRX off period, the communications device is not required to decode downlink control information allocating communications resources for the transmission of downlink data to the communications device, determining that the DRX off period has ended, determining that a minimum slot gap parameter value defining an earliest timeslot in which communications resources can be allocated by means of a downlink control message is to be changed, after the DRX off period has ended, receiving a downlink control message transmitted in a first timeslot of a wireless access interface provided by the wireless communications network, the downlink control message comprising an indication of a slot gap parameter value, the slot gap parameter value indicating a delay between the first timeslot and a second timeslot in which communications resources are allocated for the transmission of data by the wireless communications network to the communications device, and controlling the receiver of the communications device to receive signals representing the data in accordance with the changed minimum slot gap value.

Paragraph 13. A method according to paragraph 12, wherein the changed minimum slot gap parameter value is equal to a slot gap parameter value indicated by a most recently received downlink control information transmitted during a DRX on period before the DRX off period and allocating communications resources for the transmission of downlink data to the communications device.

Paragraph 14. A method according to paragraph 12, the method comprising setting the changed minimum slot gap parameter value to a predetermined default slot gap parameter value.

Paragraph 15. A method according to any of paragraphs 12 to 14 the method comprising: determining that the communications device has not received downlink control information allocating communications resources for the transmission of downlink data to the communications device during a number of most recent DRX on periods equal to a predetermined number, each DRX on period being separated from a next DRX on period by a DRX off period, wherein determining that the minimum slot gap parameter value is to be changed is in response to determining that the communications device has not received downlink control information allocating communications resources for the transmission of downlink data to the communications device during the number of most recent DRX on periods equal to the predetermined number.

Paragraph 16. A method according to any of paragraphs 12 to 14, the method comprising: determining that the communications device has not changed the minimum slot gap parameter value during a number of most recent DRX on periods equal to a predetermined number, each DRX on period being separated from a next DRX on period by a DRX off period, wherein determining that the minimum slot gap parameter value is to be changed is in response to determining that the communications device has not changed the minimum slot gap parameter value during a number of most recent DRX on periods equal to a predetermined number.

Paragraph 17. A method according to any of paragraphs 12 to 16, wherein the most recently received downlink control information transmitted before the DRX off period comprised an indication that no further data is to be transmitted to the communications device during the DRX on period, the method comprising in response to receiving the most recently received downlink control information transmitted before the DRX off period, entering the DRX off period.

Paragraph 18. A method of transmitting data by a communications device in a wireless communications network, the method comprising: transmitting via a time divided wireless access interface provided by the wireless communications network, a buffer status indication, the buffer status indication indicating a quantity of uplink data which is available for transmission by the communications device, determining, based on the quantity of uplink data indicated by the buffer status indication, a minimum slot gap parameter defining an earliest timeslot in which uplink communications resources can be allocated by means of a downlink control information (DCI) message, receiving, via the wireless access interface a DCI message providing an indication of allocated communications resources, the DCI including a slot gap ($K_2$) indicating a time slot gap between a timeslot in which the DCI is received and the allocated communications resources, wherein the allocated communications resources occur in a timeslot which is compliant with the determined minimum slot gap parameter, and controlling the communications device to transmit the data using the allocated communications resources in accordance with the determined minimum slot gap parameter.

Paragraph 19. A method according to paragraph 18, wherein the buffer status indication indicates a quantity of uplink data associated with a first logical channel, the first logical channel being associated with one or more of a quality of service requirement and a priority, the method comprising transmitting a second buffer status indication, the second buffer status indication indicating a quantity of uplink data associated with a second logical channel, the second logical channel being associated with one or more of a quality of service requirement and a priority, wherein the minimum slot gap parameter is determined based on quantity of uplink data indicated by the second buffer status indication.

Paragraph 20. A method according to paragraph 18 or paragraph 19, wherein determining, based on the quantity of uplink data indicated by the buffer status indication, a minimum slot gap parameter defining an earliest timeslot in which uplink communications resources can be allocated by means of a downlink control information (DCI) message, comprises if the quantity of uplink data indicated by the buffer status indication is below a predetermined threshold, setting the minimum slot gap parameter to a first value, and if the quantity of uplink data indicated by the buffer status indication is above the predetermined threshold, setting the minimum slot gap parameter to a second value lower than the first value.

Paragraph 21. A method of transmitting downlink control information to a communications device by an infrastructure equipment of a wireless communications network, the method comprising: transmitting, via a time divided wireless access interface provided by the wireless communications network, downlink control information (DCI) messages providing an indication of allocated communications resources, the DCIs including a slot gap parameter (K0) indicating a time slot gap between a timeslot in which the DCI is transmitted and the allocated communications resources, wherein the transmitting comprises determining that a current minimum slot gap value for the communications device is to be changed, the current minimum slot gap value defining a minimum value of the slot gap parameter which can be allocated by a DCI, allocating current communications resources for the transmission of data to the communications device, selecting a timeslot for the transmission of a DCI allocating the current communications resources based on the allocated current communications resources and a default slot gap value, and transmitting during the selected timeslot the DCI, the DCI including a slot gap parameter for the current communications resources which is less than the current minimum slot gap value for the communications device.

Paragraph 22. A method of transmitting data to a communications device by an infrastructure equipment of a wireless communications network, the method comprising: determining that a DRX off period for the communications device has ended, wherein during the DRX off period, the communications device is not required to decode downlink control information allocating communications resources for the transmission of downlink data to the communications device, determining that a minimum slot gap parameter value associated with the communications device is to be changed, the minimum slot gap parameter value defining an earliest timeslot in which communications resources can be allocated by means of a downlink control message, and after the DRX off period has ended, transmitting a downlink control message in a first timeslot of a wireless access interface provided by the infrastructure equipment, the downlink control message comprising an indication of a slot gap parameter value, the slot gap parameter value indicating a delay between the first timeslot and a second timeslot in which communications resources are allocated for the transmission of data by the infrastructure equipment to the communications device, wherein the slot gap parameter value is not less than the changed minimum slot gap parameter value.

Paragraph 23. A method of receiving data transmitted by a communications device in a wireless communications network, the method comprising: receiving by an infrastructure equipment of the wireless communications network a buffer status indication, the buffer status indication transmitted by the communications device via a wireless access interface provided by the infrastructure equipment and indicating a quantity of uplink data which is available for transmission by the communications device, determining, based on the quantity of uplink data indicated by the buffer status indication, a minimum slot gap parameter associated with the communications device, the minimum slot gap parameter defining an earliest timeslot in which uplink communications resources can be allocated by means of a downlink control information (DCI) message, transmitting, via the wireless access interface, a DCI message providing an indication of allocated communications resources, the DCI including a slot gap ($K_2$) indicating a time slot gap between a timeslot in which the DCI is received and the allocated communications resources, wherein the allocated communications resources occur in a timeslot which is compliant with the determined minimum slot gap parameter, and receiving the data using the allocated communications resources.

Paragraph 24. A communications device for operating in a wireless communications network, the communications device comprising a transmitter configured to transmit signals via a time divided wireless access interface provided by an infrastructure equipment of the wireless communications network, a receiver configured to receive signals via the wireless access interface, and a controller configured to control the transmitter and the receiver so that the communications device is operable: to receive downlink control information (DCI) messages providing an indication of allocated communications resources, the DCIs including a slot gap parameter (K0) indicating a time slot gap between a timeslot in which the DCI is received and the allocated communications resources, wherein the controller is configured to control the transmitter and the receiver so that the communications device is operable to receive the downlink control information (DCI) messages by: receiving a current DCI which includes a slot gap parameter for currently allocated communications resources, determining that the slot gap parameter for the currently allocated communications resources is less than a current minimum slot gap value, the current minimum slot gap value defining a minimum value of the slot gap parameter which can be allocated by a DCI, and in response to determining that the indicated slot gap parameter is less than the current minimum slot gap value, using a default slot gap value to detect data from communications resources of the wireless access interface, and updating the current minimum slot gap value.

Paragraph 25. Circuitry for a communications device for operating in a wireless communications network, the circuitry comprising transmitter circuitry configured to transmit signals via a time divided wireless access interface provided by an infrastructure equipment of the wireless communications network, receiver circuitry configured to receive signals via the wireless access interface, and controller circuitry configured to control the transmitter circuitry and the receiver circuitry so that the communications device is operable: to receive downlink control information (DCI) messages providing an indication of allocated communications resources, the DCIs including a slot gap parameter (K0) indicating a time slot gap between a timeslot in which the DCI is received and the allocated communications resources, wherein the controller circuitry is configured to control the transmitter circuitry and the receiver circuitry so that the communications device is operable to receive the downlink control information (DCI) messages by: receiving a current DCI which includes a slot gap parameter for currently allocated communications resources, determining that the slot gap parameter for the currently allocated communications resources is less than a current minimum slot gap value, the current minimum slot gap value defining a minimum value of the slot gap parameter which can be allocated by a DCI, and in response to determining that the indicated slot gap parameter is less than the current minimum slot gap value, using a default slot gap value to detect data from communications resources of the wireless access interface, and updating the current minimum slot gap value.

Paragraph 26. A communications device for operating in a wireless communications network, the communications device comprising a transmitter configured to transmit signals via a time divided wireless access interface provided by an infrastructure equipment of the wireless communications network, a receiver configured to receive signals via the wireless access interface, and a controller configured to control the transmitter and the receiver so that the communications device is operable: to receive downlink control information (DCI) messages providing an indication of allocated communications resources, the DCIs including a slot gap (K0) indicating a time slot gap between a timeslot in which the DCI is received and the allocated communications resources, wherein the controller is configured to control the transmitter and the receiver so that the communications device is operable to receive the downlink control information (DCI) messages by: receiving a current DCI which includes a slot gap parameter for currently allocated communications resources and an indication of a minimum slot gap value defining an earliest timeslot in which communications resources can be allocated by means of a downlink control message, and using the slot gap parameter to detect data from communications resources of the wireless access interface, and updating a current minimum slot gap value in accordance with the indicated minimum slot gap value, the current minimum slot gap value defining an earliest time slot in which communications resources can be allocated by means of a DCI.

Paragraph 27. Circuitry for a communications device for operating in a wireless communications network, the circuitry comprising transmitter circuitry configured to transmit signals via a time divided wireless access interface provided by an infrastructure equipment of the wireless communications network, receiver circuitry configured to receive signals via the wireless access interface, and controller circuitry configured to control the transmitter circuitry and the receiver circuitry so that the communications device is operable: to receive downlink control information (DCI) messages providing an indication of allocated communications resources, the DCIs including a slot gap (K0) indicating a time slot gap between a timeslot in which the DCI is received and the allocated communications resources, wherein the controller circuitry is configured to control the transmitter circuitry and the receiver circuitry so that the communications device is operable to receive the downlink control information (DCI) messages by: receiving a current DCI which includes a slot gap parameter for currently allocated communications resources and an indication of a minimum slot gap value defining an earliest timeslot in which communications resources can be allocated by means of a downlink control message, and using the slot gap parameter to detect data from communications resources of the wireless access interface, and updating a current minimum slot gap value in accordance with the indicated minimum slot gap value, the current minimum slot gap value defining an earliest time slot in which communications resources can be allocated by means of a DCI.

Paragraph 28. A communications device for operating in a wireless communications network, the communications device comprising a transmitter configured to transmit signals via a time divided wireless access interface provided by an infrastructure equipment of the wireless communications network, a receiver configured to receive signals via the wireless access interface, and a controller configured to control the transmitter and the receiver so that the communications device is operable: to receive downlink control information (DCI) messages providing an indication of allocated communications resources, the DCIs including a slot gap (K0) indicating a time slot gap between a timeslot in which the DCI is received and the allocated communications resources, wherein the controller is configured to control the transmitter and the receiver so that the communications device is operable to receive the downlink control information (DCI) messages by: receiving in a time slot a current DCI which includes a slot gap parameter for currently allocated communications resources determining based on the slot gap parameter that the currently allocated communications resources are in the same time slot as the time slot in which the current DCI is received, and in response to determining that the currently allocated communications resources are in the same time slot as the time slot in which the current DCI is received, starting a timer for a predetermined duration, to determine that the timer has expired, and in response to determining that the timer has expired, to update a current minimum slot gap value to define an earliest timeslot in which communications resources can be allocated by means of a DCI as a timeslot later than a timeslot in which the DCI is transmitted.

Paragraph 29. Circuitry for a communications device for operating in a wireless communications network, the circuitry comprising transmitter circuitry configured to transmit signals via a time divided wireless access interface provided by an infrastructure equipment of the wireless communications network, receiver circuitry configured to receive signals via the wireless access interface, and controller circuitry configured to control the transmitter circuitry and the receiver circuitry so that the communications device is operable: to receive downlink control information (DCI) messages providing an indication of allocated communications resources, the DCIs including a slot gap (K0) indicating a time slot gap between a timeslot in which the DCI is received and the allocated communications resources, wherein the controller circuitry is configured to control the transmitter circuitry and the receiver circuitry so that the communications device is operable to receive the downlink control information (DCI) messages by: receiving in a time slot a current DCI which includes a slot gap parameter for currently allocated communications resources determining based on the slot gap parameter that the currently allocated communications resources are in the same time slot as the time slot in which the current DCI is received, and in response to determining that the currently allocated communications resources are in the same time slot as the time slot in which the current DCI is received, starting a timer for a predetermined duration, to determine that the timer has expired, and in response to determining that the timer has expired, to update a current minimum slot gap value to define an earliest timeslot in which communications resources can be allocated by means of a DCI as a timeslot later than a timeslot in which the DCI is transmitted.

Paragraph 30. A communications device for operating in a wireless communications network, the communications device comprising a transmitter configured to transmit signals via a time divided wireless access interface provided by an infrastructure equipment of the wireless communications network, a receiver configured to receive signals via the wireless access interface, and a controller configured to control the transmitter and the receiver so that the communications device is operable: to receive downlink control information (DCI) messages providing an indication of allocated communications resources, the DCIs including a slot gap (K0) indicating a time slot gap between a timeslot in which the DCI is received and the allocated communications resources, wherein the controller is configured to control the transmitter and the receiver so that the communications device is operable to receive the downlink control information (DCI) messages by: receiving in a time slot a current DCI which includes a slot gap parameter for currently allocated communications resources determining based on the slot gap parameter that the currently allocated communications resources are in a time slot later than the time slot in which the current DCI is received, and in response to determining that the currently allocated communications resources are in a time slot later than the time slot in which the current DCI is received, increasing a cross slot counter, to determine that the value of the cross-slot counter has exceeded a predetermined threshold, in response to determining that the value of the cross slot counter has exceeded a predetermined threshold, to update a current minimum slot gap value to define an earliest timeslot in which downlink communications resources can be allocated by means of a DCI as a timeslot later than a timeslot in which the DCI is transmitted.

Paragraph 31. Circuitry for a communications device for operating in a wireless communications network, the circuitry comprising transmitter circuitry configured to transmit signals via a time divided wireless access interface provided by an infrastructure equipment of the wireless communications network, receiver circuitry configured to receive signals via the wireless access interface, and controller circuitry configured to control the transmitter circuitry and the receiver circuitry so that the communications device is operable: to receive downlink control information (DCI) messages providing an indication of allocated communications resources, the DCIs including a slot gap (K0) indicating a time slot gap between a timeslot in which the DCI is received and the allocated communications resources, wherein the controller circuitry is configured to control the transmitter circuitry and the receiver circuitry so that the communications device is operable to receive the downlink control information (DCI) messages by: receiving in a time slot a current DCI which includes a slot gap parameter for currently allocated communications resources determining based on the slot gap parameter that the currently allocated communications resources are in a time slot later than the time slot in which the current DCI is received, and in response to determining that the currently allocated communications resources are in a time slot later than the time slot in which the current DCI is received, increasing a cross slot counter, to determine that the value of the cross-slot counter has exceeded a predetermined threshold, in response to determining that the value of the cross slot counter has exceeded a predetermined threshold, to update a current minimum slot gap value to define an earliest timeslot in which downlink communications resources can be allocated by means of a DCI as a timeslot later than a timeslot in which the DCI is transmitted.

Paragraph 32. A communications device for operating in a wireless communications network, the communications device comprising a transmitter configured to transmit signals via a time divided wireless access interface provided by an infrastructure equipment of the wireless communications network, a receiver configured to receive signals via the wireless access interface, and a controller configured to control the transmitter and the receiver so that the communications device is operable: during a discontinuous reception (DRX) off period, to control the receiver to operate in a reduced power consumption mode, wherein during the DRX off period, the communications device is not required to decode downlink control information allocating communications resources for the transmission of downlink data to the communications device, to determine that the DRX off period has ended, to determine that a minimum slot gap parameter value defining an earliest timeslot in which communications resources can be allocated by means of a downlink control message is to be changed, after the DRX off period has ended, to receive a downlink control message transmitted in a first timeslot of the wireless access interface, the downlink control message comprising an indication of a slot gap parameter value, the slot gap parameter value indicating a delay between the first timeslot and a second timeslot in which communications resources are allocated for the transmission of data by the wireless communications network to the communications device, and to control the receiver to receive signals representing the data in accordance with the changed minimum slot gap value.

Paragraph 33. Circuitry for a communications device for operating in a wireless communications network, the communications device comprising transmitter circuitry configured to transmit signals via a time divided wireless access interface provided by an infrastructure equipment of the wireless communications network, receiver circuitry configured to receive signals via the wireless access interface, and controller circuitry configured to control the transmitter circuitry and the receiver circuitry so that the communications device is operable: during a discontinuous reception (DRX) off period, to control the receiver to operate in a reduced power consumption mode, wherein during the DRX off period, the communications device is not required to decode downlink control information allocating communications resources for the transmission of downlink data to the communications device, to determine that the DRX off period has ended, to determine that a minimum slot gap parameter value defining an earliest timeslot in which communications resources can be allocated by means of a downlink control message is to be changed, after the DRX off period has ended, to receive a downlink control message transmitted in a first timeslot of the wireless access interface, the downlink control message comprising an indication of a slot gap parameter value, the slot gap parameter value indicating a delay between the first timeslot and a second timeslot in which communications resources are allocated for the transmission of data by the wireless communications network to the communications device, and to control the receiver to receive signals representing the data in accordance with the changed minimum slot gap value.

Paragraph 34. A communications device for operating in a wireless communications network, the communications device comprising a transmitter configured to transmit signals via a time divided wireless access interface provided by an infrastructure equipment of the wireless communications network, a receiver configured to receive signals via the wireless access interface, and a controller configured to control the transmitter and the receiver so that the communications device is operable: to transmit a buffer status indication, the buffer status indication indicating a quantity of uplink data which is available for transmission by the communications device, to determine, based on the quantity of uplink data indicated by the buffer status indication, a minimum slot gap parameter defining an earliest timeslot in which uplink communications resources can be allocated by means of a downlink control information (DCI) message, to receive a DCI message providing an indication of allocated communications resources, the DCI including a slot gap (K2) indicating a time slot gap between a timeslot in which the DCI is received and the allocated communications resources, wherein the allocated communications resources occur in a timeslot which is compliant with the determined minimum slot gap parameter, and to control the communications device to transmit the data using the allocated communications resources in accordance with the determined minimum slot gap parameter.

Paragraph 35. Circuitry for a communications device for operating in a wireless communications network, the circuitry comprising transmitter circuitry configured to transmit signals via a time divided wireless access interface provided by an infrastructure equipment of the wireless communications network, receiver circuitry configured to receive signals via the wireless access interface, and controller circuitry configured to control the transmitter circuitry and the receiver circuitry so that the communications device is operable: to transmit a buffer status indication, the buffer status indication indicating a quantity of uplink data which is available for transmission by the communications device, to determine, based on the quantity of uplink data indicated by the buffer status indication, a minimum slot gap parameter defining an earliest timeslot in which uplink communications resources can be allocated by means of a downlink control information (DCI) message, to receive a DCI message providing an indication of allocated communications resources, the DCI including a slot gap ($K_2$) indicating a time slot gap between a timeslot in which the DCI is received and the allocated communications resources, wherein the allocated communications resources occur in a timeslot which is compliant with the determined minimum slot gap parameter, and to control the communications device to transmit the data using the allocated communications resources in accordance with the determined minimum slot gap parameter.

Paragraph 36. Infrastructure equipment for use in a wireless communications network, the infrastructure equipment providing a time divided wireless access interface for communicating with a communications device, the infrastructure equipment comprising a transmitter configured to transmit signals to the communications device via the wireless access interface, a receiver configured to receive signals from the communications device, and a controller configured to control the transmitter and the receiver so that the infrastructure equipment is operable: to transmit downlink control information (DCI) messages providing an indication of allocated communications resources, the DCIs including a slot gap parameter (K0) indicating a time slot gap between a timeslot in which the DCI is transmitted and the allocated communications resources, wherein the controller is configured to control the transmitter and the receiver so that the communications device is operable to transmit the downlink control information (DCI) messages by: determining that a current minimum slot gap value for the communications device is to be changed, the current minimum slot gap value defining a minimum value of the slot gap parameter which can be allocated by a DCI, allocating current communications resources for the transmission of data to the communications device, selecting a timeslot for the transmission of a DCI allocating the current communications resources based on the allocated current communications resources and a default slot gap value, and transmitting during the selected timeslot the DCI, the DCI including a slot gap parameter for the current communications resources which is less than the current minimum slot gap value for the communications device.

Paragraph 37. Circuitry for an infrastructure equipment for use in a wireless communications network, the infrastructure equipment providing a time divided wireless access interface for communicating with a communications device, the circuitry comprising transmitter circuitry configured to transmit signals to the communications device via the wireless access interface, receiver circuitry configured to receive signals from the communications device, and controller circuitry configured to control the transmitter circuitry and the receiver circuitry so that the infrastructure equipment is operable: to transmit downlink control information (DCI) messages providing an indication of allocated communications resources, the DCIs including a slot gap parameter (K0) indicating a time slot gap between a timeslot in which the DCI is transmitted and the allocated communications resources, wherein the controller circuitry is configured to control the transmitter circuitry and the receiver circuitry so that the communications device is operable to transmit the downlink control information (DCI) messages by: determining that a current minimum slot gap value for the communications device is to be changed, the current minimum slot gap value defining a minimum value of the slot gap parameter which can be allocated by a DCI, allocating current communications resources for the transmission of data to the communications device, selecting a timeslot for the transmission of a DCI allocating the current communications resources based on the allocated current communications resources and a default slot gap value, and transmitting during the selected timeslot the DCI, the DCI including a slot gap parameter for the current communications resources which is less than the current minimum slot gap value for the communications device.

Paragraph 38. Infrastructure equipment for use in a wireless communications network, the infrastructure equipment providing a time divided wireless access interface for communicating with a communications device, the infrastructure equipment comprising a transmitter configured to transmit signals to the communications device via the wireless access interface, a receiver configured to receive signals from the communications device, and a controller configured to control the transmitter and the receiver so that the infrastructure equipment is operable: to determine that a DRX off period for the communications device has ended, wherein during the DRX off period, the communications device is not required to decode downlink control information allocating communications resources for the transmission of downlink data to the communications device, to determine that a minimum slot gap parameter value associated with the communications device is to be changed, the minimum slot gap parameter value defining an earliest timeslot in which communications resources can be allocated by means of a downlink control message, and after the DRX off period has ended, to transmit a downlink control message in a first timeslot of the wireless access interface, the downlink control message comprising an indication of a slot gap parameter value, the slot gap parameter value indicating a delay between the first timeslot and a second timeslot in which communications resources are allocated for the transmission of data by the infrastructure equipment to the communications device, wherein the slot gap parameter value is not less than the changed minimum slot gap parameter value.

Paragraph 39. Circuitry for an infrastructure equipment for use in a wireless communications network, the infrastructure equipment providing a time divided wireless access interface for communicating with a communications device, the circuitry comprising transmitter circuitry configured to transmit signals to the communications device via the wireless access interface, receiver circuitry configured to receive signals from the communications device, and controller circuitry configured to control the transmitter circuitry and the receiver circuitry so that the infrastructure equipment is operable: to determine that a DRX off period for the communications device has ended, wherein during the DRX off period, the communications device is not required to decode downlink control information allocating communications resources for the transmission of downlink data to the communications device, to determine that a minimum slot gap parameter value associated with the communications device is to be changed, the minimum slot gap parameter value defining an earliest timeslot in which communications resources can be allocated by means of a downlink control message, and after the DRX off period has ended, to transmit a downlink control message in a first timeslot of the wireless access interface, the downlink control message comprising an indication of a slot gap parameter value, the slot gap parameter value indicating a delay between the first timeslot and a second timeslot in which communications resources are allocated for the transmission of data by the infrastructure equipment to the communications device, wherein the slot gap parameter value is not less than the changed minimum slot gap parameter value.

Paragraph 40. Infrastructure equipment for use in a wireless communications network, the infrastructure equipment providing a time divided wireless access interface for communicating with a communications device, the infrastructure equipment comprising a transmitter configured to transmit signals to the communications device via the wireless access interface, a receiver configured to receive signals from the communications device, and a controller configured to control the transmitter and the receiver so that the infrastructure equipment is operable: to receive a buffer status indication, the buffer status indication transmitted by the communications device and indicating a quantity of uplink data which is available for transmission by the communications device, to determine, based on the quantity of uplink data indicated by the buffer status indication, a minimum slot gap parameter associated with the communications device, the minimum slot gap parameter defining an earliest timeslot in which uplink communications resources can be allocated by means of a downlink control information (DCI) message, to transmit a DCI message providing an indication of allocated communications resources, the DCI including a slot gap ($K_2$) indicating a time slot gap between a timeslot in which the DCI is received and the allocated communications resources, wherein the allocated communications resources occur in a timeslot which is compliant with the determined minimum slot gap parameter, and to receive the uplink data using the allocated communications resources.

Paragraph 41. Circuitry for an infrastructure equipment for use in a wireless communications network, the infrastructure equipment providing a time divided wireless access interface for communicating with a communications device, the circuitry comprising transmitter circuitry configured to transmit signals to the communications device via the wireless access interface, receiver circuitry configured to receive signals from the communications device, and controller circuitry configured to control the transmitter circuitry and the receiver circuitry so that the infrastructure equipment is operable: to receive a buffer status indication, the buffer status indication transmitted by the communications device and indicating a quantity of uplink data which is available for transmission by the communications device, to determine, based on the quantity of uplink data indicated by the buffer status indication, a minimum slot gap parameter associated with the communications device, the minimum slot gap parameter defining an earliest timeslot in which uplink communications resources can be allocated by means of a downlink control information (DCI) message, to transmit a DCI message providing an indication of allocated communications resources, the DCI including a slot gap ($K_2$) indicating a time slot gap between a timeslot in which the DCI is received and the allocated communications resources, wherein the allocated communications resources occur in a timeslot which is compliant with the determined minimum slot gap parameter, and to receive the uplink data using the allocated communications resources.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] RP-182090, "Revised SID: Study on NR Industrial Internet of Things (IoT)," 3GPP RAN #81.

[2] Holma H. and Toskala A, "LTE for UMTS OFDMA and SC-FDMA based radio access", John Wiley and Sons, 2009
[3] 3GPP TS 38.321, "Medium Access Control (MAC) protocol specification (Rel-15)", v15.3.0
[4] 3GPP TS 38.214 "NR; Physical layer procedures for data (Release 15)", version 15.2.0
[5] RP-190727, "New WID: UE Power Saving in NR", CATT, CAICT, 3GPP RAN #83
[6] 3GPP Tdoc R1-1907323 "Procedure for cross-slot scheduling technique", Ericsson
[7] 3GPP Tdoc R1-1907105 "On Cross-slot Scheduling for UE Power Saving" InterDigital, Inc.

What is claimed is:

1. A method of receiving downlink control information by a communications device from a wireless communications network, the method comprising:
  receiving, via a time divided wireless access interface provided by the wireless communications network, downlink control information (DCI) messages providing an indication of allocated communications resources, the DCI messages including a slot gap parameter (K0) indicating a time slot gap between a timeslot in which the DCI messages are received and the allocated communications resources, wherein the receiving comprises
    receiving a current DCI which includes a slot gap parameter for currently allocated communications resources,
    determining that the slot gap parameter for the currently allocated communications resources is less than a current minimum slot gap value, the current minimum slot gap value defining a minimum value of the slot gap parameter, and
    in response to determining that the indicated slot gap parameter is less than the current minimum slot gap value, using a default slot gap value to detect data from communications resources of the wireless access interface, and updating the current minimum slot gap value.

2. The method according to claim 1, wherein
  updating the current minimum slot gap value comprises setting the current minimum slot gap value to the slot gap parameter in the current DCI.

3. The method of receiving downlink control information by a communications device from a wireless communications network, the method comprising:
  receiving, via a time divided wireless access interface provided by the wireless communications network, downlink control information (DCI) messages providing an indication of allocated communications resources, the DCIs including a slot gap (K0) indicating a time slot gap between a timeslot in which the DCI is received and the allocated communications resources, wherein
  the receiving comprises
    receiving in a time slot a current DCI which includes a slot gap parameter for currently allocated communications resources
    determining based on the slot gap parameter that the currently allocated communications resources are in a time slot later than the time slot in which the current DCI is received, and
    in response to determining that the currently allocated communications resources are in a time slot later than the time slot in which the current DCI is received, increasing a cross slot counter,
    determining that the value of the cross-slot counter has exceeded a predetermined threshold, and
    in response to determining that the value of the cross slot counter has exceeded a predetermined threshold, updating a current minimum slot gap value to define an earliest timeslot in which downlink communications resources can be allocated by means of a DCI as a timeslot later than a timeslot in which the DCI is transmitted.

4. The method according to claim 3, wherein the receiving comprises:
  receiving a second DCI which includes a second slot gap parameter for second allocated communications resources,
  determining based on the second slot gap parameter that the second allocated communications resources are in the same time slot as the time slot in which the second DCI is received, and
  in response to determining that the second allocated communications resources are in the same time slot as the time slot in which the second DCI is received, resetting the cross-slot counter.

5. The method according to claim 1, the method comprising:
  operating in either a cross slot mode in which communications resources allocated by a DCI are in a later time slot than the time slot in which the DCI is received or a same slot mode in which the communications resources are in the same time slot as the DCI.

6. The method according to claim 5, wherein
  when the current minimum slot gap value is zero, operating in the same slot mode, and when the current minimum slot gap value is greater than zero, operating in the cross slot mode.

7. The method according to claim 5, wherein operating in the cross slot mode comprises:
  operating a receiver of the communications device to receive a DCI in a first portion of a time slot, and operating the receiver in a reduced power consumption mode during a second portion of the time slot after the first portion.

8. The method according to claim 7, wherein
  operating the receiver in the reduced power consumption mode comprises disabling one or more radio frequency (RF) components within the receiver.

9. The method according to claim 5, wherein operating in the same slot mode comprises:
  operating a receiver of the communications device to receive a DCI in a first portion of a time slot; and
  operating the receiver to receive and store signals transmitted using communications resources which may be allocated by the DCI during a second portion of the time slot after the first portion.

10. A method of receiving data by a communications device from a wireless communications network, the method comprising:
  during a discontinuous reception (DRX) off period, controlling a receiver of the communications device to operate in a reduced power consumption mode, wherein during the DRX off period, the communications device is not required to decode downlink control information allocating communications resources for the transmission of downlink data to the communications device,
  determining that the DRX off period has ended,
  determining that a minimum slot gap parameter value defining an earliest timeslot in which communications resources are can be allocated by means of a downlink control message is to be changed, after the DRX off period has ended, receiving a downlink control message transmitted in a first timeslot of a wireless access interface provided by the wireless communications network, the downlink control message comprising an indication of a slot gap parameter value, the slot gap parameter value indicating a delay between the first timeslot and a second timeslot in which communications resources are allocated for the transmission of data by the wireless communications network to the communications device, and controlling the receiver of the communications device to receive signals representing the data in accordance with the changed minimum slot gap value.

11. The method according to claim 10, wherein the changed minimum slot gap parameter value is equal to a slot gap parameter value indicated by a most recently received downlink control information transmitted during a DRX on period before the DRX off period and allocating communications resources for the transmission of downlink data to the communications device.

12. The method according to claim 10, the method comprising:

setting the changed minimum slot gap parameter value to a predetermined default slot gap parameter value.

13. The method according to claim 10, the method comprising:

determining that the communications device has not received downlink control information allocating communications resources for the transmission of downlink data to the communications device during a number of most recent DRX on periods equal to a predetermined number, each DRX on period being separated from a next DRX on period by a DRX off period, wherein determining that the minimum slot gap parameter value is to be changed is in response to determining that the communications device has not received downlink control information allocating communications resources for the transmission of downlink data to the communications device during the number of most recent DRX on periods equal to the predetermined number.

14. The method according to claim 10, the method comprising:

determining that the communications device has not changed the minimum slot gap parameter value during a number of most recent DRX on periods equal to a predetermined number, each DRX on period being separated from a next DRX on period by a DRX off period, wherein determining that the minimum slot gap parameter value is to be changed is in response to determining that the communications device has not changed the minimum slot gap parameter value during a number of most recent DRX on periods equal to a predetermined number.

15. The method according to claim 10, wherein the most recently received downlink control information transmitted before the DRX off period comprised an indication that no further data is to be transmitted to the communications device during the DRX on period, and the method further comprises, in response to receiving the most recently received downlink control information transmitted before the DRX off period, entering the DRX off period.

16. A method of transmitting data by a communications device in a wireless communications network, the method comprising:

transmitting via a time divided wireless access interface provided by the wireless communications network, a buffer status indication, the buffer status indication indicating a quantity of uplink data which is available for transmission by the communications device, determining, based on the quantity of uplink data indicated by the buffer status indication, a minimum slot gap parameter defining an earliest timeslot to allocate uplink communications resources by a downlink control information (DCI) message, receiving, via the wireless access interface a DCI message providing an indication of allocated communications resources, the DCI including a slot gap (K2) indicating a time slot gap between a timeslot in which the DCI is received and the allocated communications resources, wherein the allocated communications resources occur in a timeslot which is compliant with the determined minimum slot gap parameter, and controlling the communications device to transmit the data using the allocated communications resources in accordance with the determined minimum slot gap parameter.

17. The method according to claim 16, wherein the buffer status indication indicates a quantity of uplink data associated with a first logical channel, the first logical channel being associated with one or more of a quality of service requirement and a priority, the method comprising transmitting a second buffer status indication, the second buffer status indication indicating a quantity of uplink data associated with a second logical channel, the second logical channel being associated with one or more of a quality of service requirement and a priority, wherein the minimum slot gap parameter is determined based on quantity of uplink data indicated by the second buffer status indication.

18. The method according to claim 16, wherein determining, based on the quantity of uplink data indicated by the buffer status indication, a minimum slot gap parameter defining an earliest timeslot to allocate uplink communications resources by a downlink control information (DCI) message, comprises if the quantity of uplink data indicated by the buffer status indication is below a predetermined threshold, setting the minimum slot gap parameter to a first value, and if the quantity of uplink data indicated by the buffer status indication is above the predetermined threshold, setting the minimum slot gap parameter to a second value lower than the first value.

* * * * *